(12) United States Patent
Inoue et al.

(10) Patent No.: US 9,098,385 B2
(45) Date of Patent: Aug. 4, 2015

(54) CONTENT MANAGING APPARATUS, CONTENT MANAGING METHOD, CONTENT MANAGING PROGRAM, AND INTEGRATED CIRCUIT

(75) Inventors: Ryuji Inoue, Osaka (JP); Ryota Tsukidate, Osaka (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 401 days.

(21) Appl. No.: 13/575,312

(22) PCT Filed: Nov. 25, 2011

(86) PCT No.: PCT/JP2011/006588
§ 371 (c)(1),
(2), (4) Date: Jul. 26, 2012

(87) PCT Pub. No.: WO2012/073470
PCT Pub. Date: Jun. 7, 2012

(65) Prior Publication Data
US 2012/0296978 A1   Nov. 22, 2012

(30) Foreign Application Priority Data
Nov. 30, 2010   (JP) ................. 2010-267802

(51) Int. Cl.
| | | |
|---|---|---|
| G06F 15/173 | (2006.01) |
| G06F 13/00 | (2006.01) |
| G06F 17/30 | (2006.01) |
| G06Q 10/10 | (2012.01) |
| H04N 1/00 | (2006.01) |

(Continued)

(52) U.S. Cl.
CPC ............. *G06F 13/00* (2013.01); *G06F 17/30* (2013.01); *G06Q 10/10* (2013.01); *G06Q 30/0201* (2013.01); *G06Q 50/01* (2013.01); *H04N 1/00* (2013.01); *H04N 1/00148* (2013.01)

(58) Field of Classification Search
None
See application file for complete search history.

(56) References Cited

U.S. PATENT DOCUMENTS 7,248,832 B2 * 7/2007 Ikeda et al. ............ 455/39
8,010,516 B2   8/2011 Ishii et al.
(Continued)

FOREIGN PATENT DOCUMENTS

JP   2005-086472   3/2005
JP   2005-346494   12/2005
(Continued)

OTHER PUBLICATIONS

International Search Report issued Feb. 28, 2012 in International (PCT) Application No. PCT/JP2011/006588.

*Primary Examiner* — Mohamed Ibrahim
(74) *Attorney, Agent, or Firm* — Wenderoth, Lind & Ponack, L.L.P.

(57) ABSTRACT

A content managing apparatus includes: an obtaining unit which obtains (i) a first content item held by a first user, (ii) a metadata item that indicates attribute information for classifying the first content item, and (iii) information on a sharing state, between the first user and a second user who is a user other than the first user, of a second content item having a metadata item identical to the metadata item held by the first content item; a degree of interest calculating unit which calculates a degree of interest that is an index indicating an interest of the second user on the metadata item; and a managing unit which manages the first content item based on the degree of interest of the second user.

17 Claims, 17 Drawing Sheets

(51) Int. Cl.
*G06Q 50/00* (2012.01)
*G06Q 30/02* (2012.01)

(56) References Cited

U.S. PATENT DOCUMENTS

| | | |
|---|---|---|
| 8,150,807 B2 | 4/2012 | Fredlund et al. |
| 2005/0251411 A1 | 11/2005 | Ishii et al. |
| 2006/0218225 A1* | 9/2006 | Hee Voon et al. ............. 709/201 |
| 2009/0094247 A1 | 4/2009 | Fredlund et al. |
| 2009/0234876 A1* | 9/2009 | Schigel et al. ................ 707/102 |
| 2010/0262658 A1* | 10/2010 | Mesnage ....................... 709/204 |
| 2012/0023204 A1 | 1/2012 | Takemura |
| 2012/0259975 A1* | 10/2012 | Le et al. ........................ 709/224 |

FOREIGN PATENT DOCUMENTS

| | | |
|---|---|---|
| JP | 2006-186664 | 7/2006 |
| JP | 2007-336083 | 12/2007 |
| JP | 2008-283412 | 11/2008 |
| JP | 2009-099142 | 5/2009 |
| JP | 2010-244328 | 10/2010 |
| WO | 2009/045441 | 4/2009 |

* cited by examiner

FIG. 3

| Content ID | CID_00001 |
|---|---|
| Metadata | Taro |
| Recipient user ID | UID_00001 |
| Number of views | 3 |
| Comment | Way to go! Taro! |

FIG. 4

| Metadata | Recipient user ID | Number of content-sharing times | Number of views | Number of comment inputs | Degree of interest |
|---|---|---|---|---|---|
| Taro | UID_00001 | 10 | 16 | 4 | 1.8 |
| Cooking | UID_00001 | 10 | 10 | 4 | 1.2 |
| | UID_00002 | 15 | 20 | 10 | 1.67 |
| | UID_00003 | 8 | 8 | 0 | 1.0 |
| Boxed lunch | UID_00001 | 7 | 10 | 0 | 1.43 |
| | UID_00002 | 5 | 11 | 2 | 2.0 |
| Knitted fabric | UID_00001 | 14 | 16 | 0 | 1.14 |
| | UID_00003 | 12 | 16 | 8 | 1.67 |
| ... | ... | ... | | | ... |

FIG. 5

| Metadata | Recipient user ID | Number of content-sharing times | Number of views | Number of comment inputs | Degree of interest |
|---|---|---|---|---|---|
| Taro | UID_00001 | 11 | 16 | 4 | 1.86 |
| Cooking | UID_00001 | 10 | 10 | 4 | 1.2 |
|  | UID_00002 | 15 | 20 | 10 | 1.67 |
|  | UID_00003 | 8 | 8 | 0 | 1.0 |
| Boxed lunch | UID_00001 | 7 | 10 | 0 | 1.43 |
|  | UID_00002 | 5 | 11 | 2 | 2.0 |
| Knitted fabric | UID_00001 | 14 | 16 | 0 | 1.14 |
|  | UID_00003 | 12 | 16 | 8 | 1.67 |
| ... | ... | ... |  |  | ... |

FIG. 6

| Content ID | Metadata | Recipient user ID | Degree of interest |
|---|---|---|---|
| CID_00010 | Cooking | UID_00001 | 1.2 |
|  |  | UID_00002 | 1.32 |
|  |  | UID_00003 | 1.08 |

FIG. 8A

| Content ID | Metadata | Recipient user ID | Degree of interest |
|---|---|---|---|
| CID_00011 | Boxed lunch | UID_00001 | 1.2 |
| | | UID_00002 | 1.32 |
| | | UID_00003 | 1.08 |
| | Taro | UID_00001 | 1.8 |
| | | UID_00002 | 0 |
| | | UID_00003 | 0 |

FIG. 8B

| Content ID | Metadata | Recipient user ID | Degree of interest |
|---|---|---|---|
| CID_00011 | Boxed lunch, Taro | UID_00001 | 1.8 |
| | | UID_00002 | 1.32 |
| | | UID_00003 | 1.08 |

FIG. 8C

| Content ID | Metadata | Recipient user ID | Degree of interest |
|---|---|---|---|
| CID_00011 | Boxed lunch, Taro | UID_00001 | 1.2 |
| | | UID_00002 | 0 |
| | | UID_00003 | 0 |

| Content ID | CID_00001 |
|---|---|
| Metadata | Taro |
| Recipient user ID | UID_00001 |
| Time and date of sharing | April 2, 2010, 15:30 |
| Number of views | 3 |
| Time and date of viewing (1) | April 2, 2010, 17:25 |
| Time and date of viewing (2) | April 3, 2010, 9:18 |
| Time and date of viewing (3) | April 28, 2010, 12:40 |
| Comment | Way to go! Taro! |
| Time and date of inputting comment | April 2, 2010, 17:35 |

| Number of content-sharing times | Recipient user's operation | Number of views | Number of comment inputs | Degree of interest | Time |
|---|---|---|---|---|---|
| 1 | View | 1 | 0 | 1 | t1 |
| 2 | View | 2 | 0 | 1 | t2 |
| | Comment | 2 | 1 | 1.25 | t3 |
| 3 | View | 3 | 1 | 1.17 | t4 |
| | Comment | 3 | 2 | 1.33 | t5 |
| 4 | View | 4 | 2 | 1.25 | t6 |
| 5 | View | 5 | 2 | 1.2 | t7 |
| | Comment | 5 | 3 | 1.3 | t8 |
| 5 | View | 6 | 3 | 1.5 | t9 |
| 6 | View | 7 | 3 | 1.42 | t10 |
| 7 | View | 8 | 3 | 1.36 | t11 |
| | Comment | 8 | 4 | 1.43 | t12 |
| | View | 9 | 4 | 1.57 | t13 |
| | View | 10 | 4 | 1.71 | t14 |

FIG. 13

| Metadata | Travel |
|---|---|
| Recipient user ID | UID_00001 |
| Sharing control information | Automatic |
| Degree of interest (1) | 1 |
| ... | ... |
| Degree of interest (2) | 1.71 |

FIG. 16

| Number of content-sharing times | Recipient user's operation | Number of views | Number of comment inputs | Degree of interest | |
|---|---|---|---|---|---|
| 1 | View | 1 | 0 | 1 | |
| 2 | View | 2 | 0 | 1 | |
| 2 | Comment | 2 | 1 | 1.25 | |
| 3 | View | 3 | 1 | 1.17 | |
| 3 | Comment | 3 | 2 | 1.33 | |
| 4 | View | 4 | 2 | 1.25 | |
| 5 | View | 5 | 2 | 1.2 | |
| 5 | Comment | 5 | 3 | 1.3 | |
| 5 | View | 6 | 3 | 1.5 | |
| 6 | View | 7 | 3 | 1.42 | |
| 7 | View | 8 | 3 | 1.36 | ←P1 |
| 7 | Comment | 8 | 4 | 1.43 | |
| 7 | View | 9 | 4 | 1.57 | |
| 7 | View | 10 | 4 | 1.71 | |
| 7 | View | 11 | 4 | 1.86 | |
| 7 | View | 12 | 4 | 2 | |
| 7 | Comment | 13 | 4 | 2.14 | |
| 7 | View | 14 | 4 | 2.29 | |
| 7 | Comment | 15 | 4 | 2.43 | |
| 7 | View | 16 | 4 | 2.57 | |
| 7 | View | 17 | 4 | 2.71 | ←P2 |
| 8 | - | 17 | 4 | 2.375 | |
| 9 | - | 17 | 4 | 2.11 | |
| 10 | - | 17 | 4 | 1.9 | |
| 11 | - | 17 | 4 | 1.73 | |
| 12 | - | 17 | 4 | 1.58 | |
| 13 | - | 17 | 4 | 1.46 | |

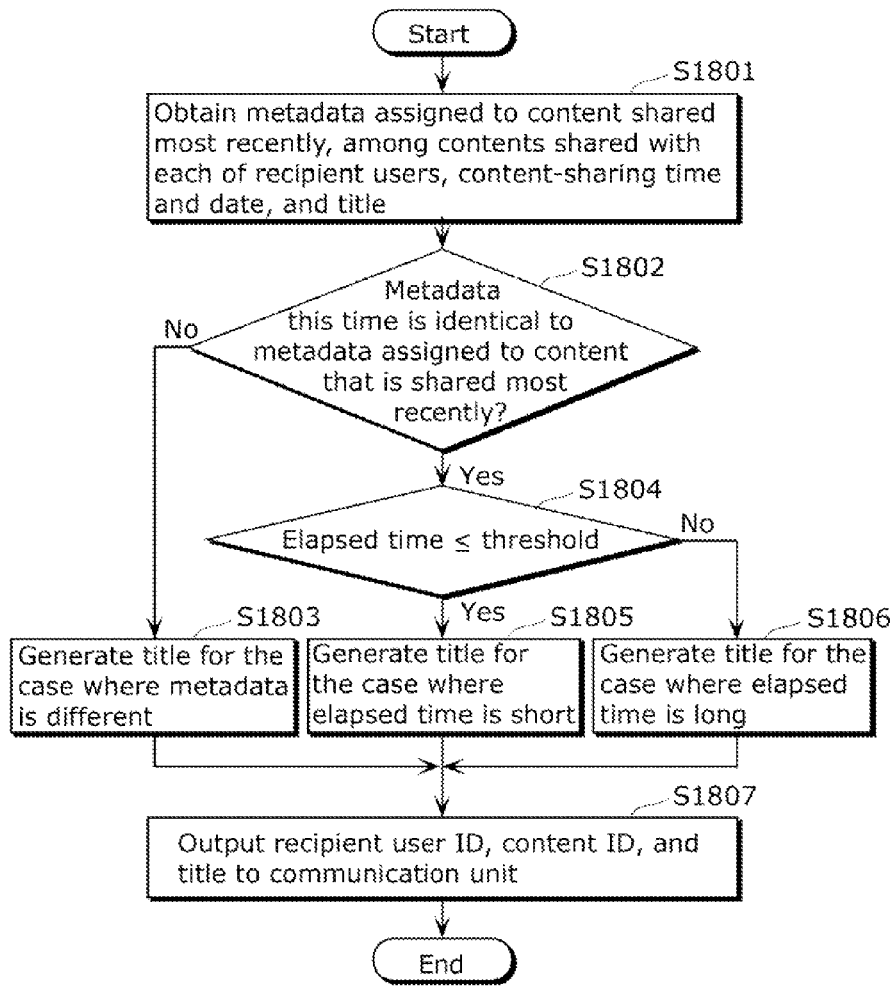

CONTENT MANAGING APPARATUS, CONTENT MANAGING METHOD, CONTENT MANAGING PROGRAM, AND INTEGRATED CIRCUIT

TECHNICAL FIELD

The present invention relates to content managing apparatuses and the like. The present invention particularly relates to a content managing apparatus, a content managing method, a content managing program, and an integrated circuit thereof, for managing a content item such as an image, audio, video, and text.

BACKGROUND ART

In recent years, with the wide spread use of a digital still camera, a digital video camera, and a mobile phone with a camera, occasions in which an individual person captures and stores a content item such as an image, audio, and video have increased significantly. In addition, communication is actively conducted, by sharing such a content item with a friend or a member of family, to share one's experience, recommend a travel destination, or have fun talking about one's memory.

Such content items are managed using photographs on which the content items are printed, video tapes, and the like. However, more and more content items can be managed electronically today, using a personal computer connected to a network or a content managing apparatus. The sharing of an electronic content item has been conducted widely due to significantly low costs for management and the high-level convenience.

On the other hand, a managed content item is shared, in some cases, with a partner user without concerning the interest of the partner user, for example. This brings about the possibility of annoying the partner user by the sharing of a content item which the partner user has no interest in viewing. It is therefore desirable, for both of the users; the user who is a sharer of the content item and the user who is a recipient of the content item, that the content item is managed properly between users who are interested in the content item.

As a conventional technique for knowing a user's interest, there is a technique of collecting history of a program viewed by a viewer of a television program (see Patent Literature 1, for example).

In addition, there is a technique of collecting comments from viewers of a television program and classifying the viewers according to the viewer's preferences (see Patent Literature 2, for example).

CITATION LIST

Patent Literature

[PTL 1] Japanese Unexamined Patent Application Publication No. 2006-186664
[PTL 2] Japanese Unexamined Patent Application Publication No. 2008-283412

SUMMARY OF INVENTION

Technical Problem

However, with the technique disclosed by the Patent Literature 1, although information on a viewer terminal and a target content item to be viewed are stored as history information, the degree of interest is unknown. Thus, managing a shared content item based on this information could lead to sharing of the content item with a user who happened to view the content item without having particular interest.

In addition, with the technique disclosed by the Patent Literature 2, the degrees of interest are grouped into "positive" or "negative". Accordingly, although a simple operation such as sharing a content item with a positive user can be expected, delicate management cannot be expected such as terminating the sharing of a content item in consideration of the recent decrease in the interest. In addition, when comment input from a recipient user cannot be obtained, it is not possible to know the degree of interest of the recipient user with this technique.

Thus, with the conventional techniques, since the grain size of the degree of interest is coarse, the method of managing a content item according to the degree of interest is inevitably coarse, too. To be specific, a temporal change in user's interest is not reflected to the method of managing a content item. This brings an overload of information to a user who is a viewer, leading to a problem that the efficiency of viewing operation decreases.

In view of the above, an object of the present invention is to provide a content managing apparatus which properly performs content item management in view of the temporal change in interest.

Solution to Problem

A content managing apparatus according to an aspect of the present invention is a content managing apparatus including: an obtaining unit configured to obtain (i) a first content item held by a first user, (ii) a metadata item that indicates attribute information for classifying the first content item, and (iii) information on a sharing state of a second content item between the first user and a second user who is a user other than the first user, the second content item being a content item having a metadata item identical to the metadata item held by the first content item; a degree of interest calculating unit configured to calculate a degree of interest of the second user, based on the information on the sharing state of the second content item, the degree of interest being an index indicating an interest in the metadata item; and a managing unit configured to manage the first content item, based on the degree of interest of the second user.

According to the above-described configuration, the content managing apparatus calculates the most recent degree of interest of a user in a metadata item held by the second content item that is already shared. In addition, the content managing apparatus manages the first content item that is a content item holding the same metadata item as the second content item, based on the calculated degree of interest. The configuration described above allows the content managing apparatus to properly perform management in view of the temporal change in the user's interest.

In addition, the managing unit may determine that the first content item should be shared with the second user when the degree of interest of the second user is higher than or equal to a predetermined first threshold.

According to the above configuration, the managing unit is capable of calculating, based on sharing history of a content item having the same metadata item as metadata item held by a new content item to be shared, the degree of a user's interest in the metadata item held by the content item, and selects a user who has a high degree of interest as a recipient. Accordingly, as the user's degree of interest in the metadata item increases, a content item having the same metadata item is increasingly shared. More specifically, it is possible to provide a content managing apparatus which properly performs the sharing control for a content item in view of the temporal change in the user's interest in the content item.

In addition, the managing unit may determine that deletion of the first content item by the first user should be prohibited when the degree of interest of the second user is higher than or equal to a predetermined first threshold.

According to the above configuration, the managing unit is capable of preventing the first user who is the owner of a content item from deleting the content item which has metadata item in which the degree of interest of the second user who is the recipient of the content item is higher than or equal to a predetermined value. Accordingly, it is possible to prevent erroneous deletion of a content item in which another user has a strong interest.

In addition, the managing unit may determine that the first content item should be deleted when the degree of interest of the second user is lower than or equal to a predetermined first threshold.

According to the above configuration, the managing unit determines that a content item should be deleted when the content item has metadata item in which the degree of interest of the second user who is the recipient of the content item is lower than or equal to a predetermined value. According to the configuration described above, it is possible to prevent an excess increase in the shared content item, and facilitate organizing the shared content item.

In addition, the information on the sharing state may be the number of content-sharing times that is the number of times that the second content item has been shared between the second user and the first user, and the degree of interest calculating unit may calculate the degree of interest as a value obtained by dividing, by the number of content-sharing times, a sum of values corresponding to at least one of (i) the number of views, (ii) the number of comment input times, (iii) an amount of view time, and (iv) the number of characters in a comment, of the second user for the second content item.

According to the above configuration, the degree of interest decreases immediately after a content item is shared because a numerator such as the number of views is constant and only the number of content-sharing times that is a denominator increases. Subsequently, when the recipient user performs an active viewing operation such as viewing and inputting a comment, the degree of interest increases according to the frequency or the like. On the other hand, when the recipient user performs none of the viewing operations, the degree of interest remains low. Accordingly, in the case where the used-to-be strong user's interest in the content item has decreased recently, the sharing control unit is capable of performing suitable control by reflecting the temporal change in the interest into the degree of interest, in response to an act of inaction, that is, "no view after sharing".

In addition, the information on the sharing state may be the number of content-sharing times indicating the number of times that the second content item has been shared between the second user and the first user, and the degree of interest calculating unit may calculate the degree of interest as a value obtained by dividing, by the number of content-sharing times, a sum of values corresponding to at least one of (i) a period of time from a point when the second content item is shared between the second user and the first user to a point when the second user views the second content item for the first time, (ii) a period of time from a point when the second user confirms the sharing state of the second content item between the second user and the first user to a point when the second user views the second content item for the first time, (iii) a difference obtained by subtracting a value corresponding to the number of negative comments on the second content item from a value corresponding to the number of positive comments on the second content item, (iv) a period of time from a point when the second user views the second content item to a point when the second user views the same second content item next time, (v) a period of time from a point when the second user views the second content item to a point when the second user inputs a comment on the second content item, and (vi) a ratio of a period of view time of the second content item by the second user to a total view time of all content items by the second user during a predetermined period of time, the negative comments and positive comments being inputted by the second user.

According to the above configuration, the degree of interest calculating unit is capable of reflecting, into the degree of interest, the result of further detailed analysis of the recipient user's viewing operation. As a result, it is possible to more accurately calculate the degree of interest that represents the interest of the user.

In addition, the managing unit may (i) examine whether or not the degree of interest of the second user is higher than or equal to a predetermined first threshold, and determine that the first content item should be shared in a first mode between the first user and the second user when the degree of interest is higher than or equal to the first threshold, and (ii) for the second user whose degree of interest is lower than the first threshold, examine whether or not the degree of interest is higher than or equal to a predetermined second threshold, and determine that the first content item should be shared in a second mode between the first user and the second user when the degree of interest is lower than the first threshold and higher than or equal to the second threshold, the second mode being different from the first mode.

According to the above configuration, the sharing control unit is capable of selecting more specifically a mode of sharing with a user, according to the degree of interest.

In addition, the managing unit may (i) in the first mode, cause the first content item to be shared between the first user and the second user without asking the first user for confirmation, and (ii) in the second mode, ask the first user for confirmation, and cause the first content item to be shared between the first user and the second user only when an instruction to share the first content item is received.

In addition, the managing unit may use, as the degree of interest of the second user when the content item has the metadata item including a plurality of metadata items, one of (i) a highest degree of interest among degrees of interest of the second user in the respective metadata items, (ii) a lowest degree of interest among the degrees of interest of the second user in the respective metadata items, and (iii) an average of the degrees of interest of the second user in the respective metadata items.

According to the above configuration, even when a content item has a plurality of metadata items and thus each of the users is associated with plural degrees of interest, the sharing control unit is capable of determining one degree of interest and selecting a user who should be a recipient.

In addition, the managing unit may (i) cause the first content item to be shared in a third mode with the second user whose degree of interest is determined as being on an increase, and (ii) cause the first content item to be shared in a fourth mode with the second user whose degree of interest is determined as being on a decrease, the fourth mode being different from the third mode.

To be specific, the managing unit may (i) determine that the degree of interest is on the increase when the degree of interest continuously increases the most-recent predetermined number of times, and (ii) determine that the degree of interest is on the decrease when the degree of interest continuously decreases the most-recent predetermined number of times.

In addition, the content managing apparatus may further include a communication unit, and the managing unit may cause the first content item to be shared between the first user and the second user when it is determined that the first content item should be shared between the first user and the second user, and the communication unit may notify the second user that the first content item is viewable and to increment the number of content-sharing times by one.

In addition, the managing unit may generate a title corresponding to the first content item, based on the metadata item held by the first content item and a past content item shared state between the second user and the first user.

To be specific, The content managing apparatus may further include: a determining unit; and a title generating unit and the determining unit may determine whether or not the metadata item held by the first content item and a metadata item held by a content item previously shared between the first user and the second user are different, (A) when the determining unit determines that the metadata item held by the first content item and the metadata item held by the content item previously shared between the first user and the second user are different, the title generating unit may generate the title in a fifth mode, (B) when the determining unit determines that the metadata item held by the first content item and the metadata item held by the content item previously shared between the first user and the second user are identical, the determining unit may determine whether or not an elapsed time since the content item was shared last time is longer than or equal to a predetermined third threshold, the title generating unit may: generate the title in a sixth mode that is different from the fifth mode when the elapsed time is determined as being longer than or equal to the third threshold; and generate the title in a seventh mode that is different from the both of the fifth mode and the sixth mode when the elapsed time is determined as being shorter than the third threshold.

It is to be noted that the present invention can be implemented not only as a content managing apparatus including characteristic processing units but also as a content managing method including, as steps, processes performed by the characteristic processing units included in the content managing apparatus. In addition, the present invention can also be implemented as a content managing program which causes a computer to execute the characteristic steps included in the content managing method. Furthermore, it should be understood that such a content managing program can be distributed via a computer-readable non-volatile recording medium such as a CD-ROM (Compact Disc-Read Only Memory) and the like and a communication network such as the Internet. In addition, the present invention can also be implemented as an integrated circuit including the same processing units as the processing units included by the content managing apparatus.

Advantageous Effects of Invention

It is possible to provide a content managing apparatus which properly performs content management in view of the temporal change in interest.

BRIEF DESCRIPTION OF DRAWINGS

FIG. 3 is a diagram illustrating an example of content related information according to Embodiments 1 to 5 of the present invention.

FIG. 4 is a diagram illustrating an example of metadata item related information according to Embodiments 1 to 5 of the present invention.

FIG. 5 is a diagram illustrating an example in which the metadata item related information according to Embodiments 1 to 5 of the present invention is updated.

FIG. 6 is a diagram illustrating an example of information to be transmitted from a storage processing unit to a sharing control unit according to Embodiments 1 to 5 of the present invention.

FIG. 8A is a diagram illustrating an example of information to be transmitted from the storage processing unit to the sharing control unit according to Embodiments 1 to 5 of the present invention.

FIG. 8B is a diagram illustrating another example of the information to be transmitted from the storage processing unit to the sharing control unit according to Embodiments 1 to 5 of the present invention.

FIG. 8C is a diagram illustrating yet another example of the information to be transmitted from the storage processing unit to the sharing control unit according to Embodiments 1 to 5 of the present invention.

FIG. 13 is a diagram illustrating another example of metadata item related information according to Embodiments 1 to 5 of the present invention.

FIG. 16 is a diagram illustrating an example of transition of content sharing, viewing operation, and a degree of interest according to Embodiments 4 of the present invention.

FIG. 18 is a flowchart illustrating operations of the sharing control unit according to Embodiment 5 of the present invention.

FIG. 19 is a diagram illustrating an example of information that is obtained by the sharing control unit according to Embodiment 5 of the present invention.

DESCRIPTION OF EMBODIMENTS

The following describes embodiments of the present invention with reference to the drawings. It is to be noted that, as the order of explanation, a detailed explanation for a content sharing control function, among management functions of the content managing apparatus, will be presented, followed by other management functions.

Embodiment 1

Figure 1:
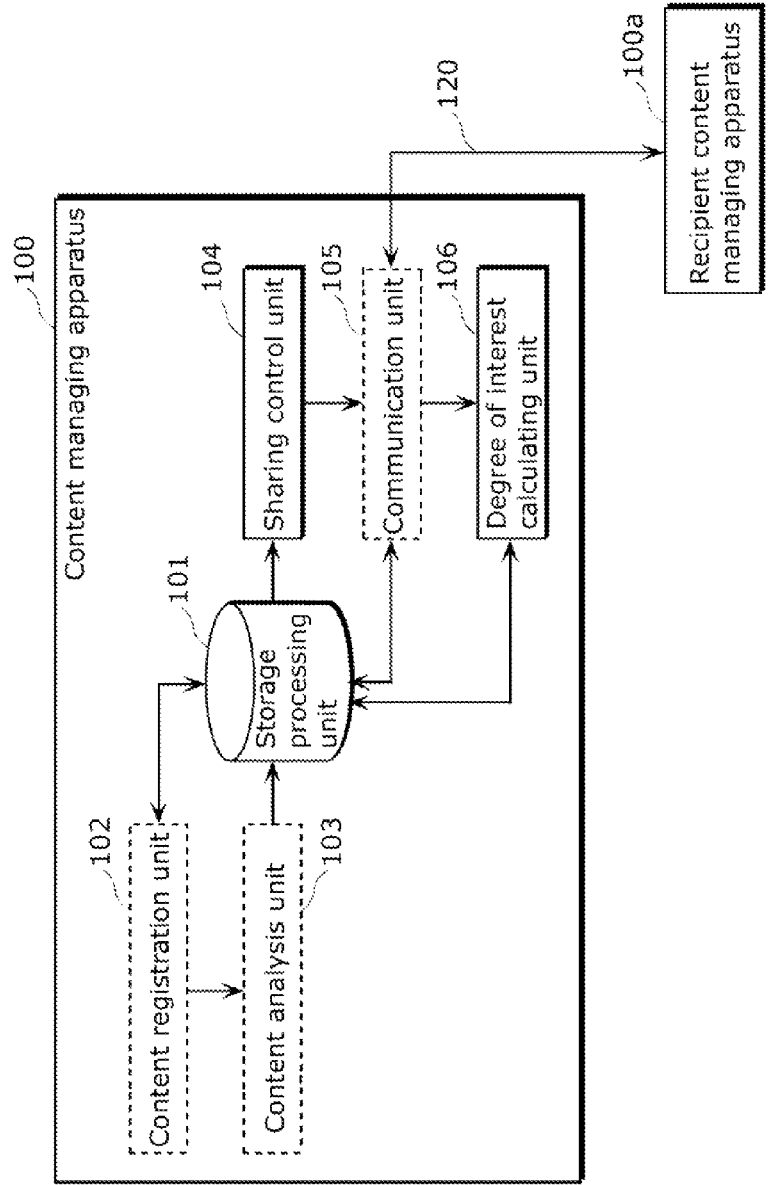
FIG. 1 is a block diagram illustrating a functional configuration of a content managing apparatus according to Embodiment 1 of the present invention.

FIG. 1 is a block diagram illustrating a functional configuration of a content managing apparatus 100 and a recipient content managing apparatus 100a according to Embodiment 1 of the present invention.

As shown in FIG. 1, the content managing apparatus 100 includes: a storage processing unit 101; a content registration unit 102; a content analysis unit 103; a sharing control unit 104; a communication unit 105; and a degree of interest calculating unit 106. In addition, the recipient content managing apparatus 100a has the same configuration as the configuration of the content managing apparatus 100.

The content managing apparatus 100 determines whether or not a first content item held by a user who uses the content managing apparatus 100 (this user is referred to as a first user or a sharer user) should be shared between a user who uses the recipient content managing apparatus 100a (this user is referred to as a second user) and the first user.

It is to be noted that, although the recipient content managing apparatus 100a is assumed to be a single apparatus and a user who uses the recipient content managing apparatus 100a is assumed to be one person for illustrative purposes in the description below, the user who can be the partner of the first user to share a content item may be plural in number, and the users may own their respective recipient content managing apparatuses 100a.

In any event, when the first content item held by the first user is to be shared between the first user and the second user who is different from the first user, the content managing apparatus 100 manages how to share the content item.

The storage processing unit 101 stores (i) the first content item, (ii) the metadata item that is attribute information for classifying the first content item, and (iii) information on sharing state, between the first user and the second user, of the second content item that is a content item including metadata item having the same details as the metadata item held by the first content item. Hereinafter, the second content item refers to both of the first content item and a content item other than the first content item, which has the same metadata item as the metadata item held by the first content item.

To be more specific, the storage processing unit 101 stores, in addition to the first content item; a recipient user ID for identifying a recipient user who is a user with whom the second content item has been shared by the first user previously; a metadata item of the second content item; the degree of interest; the number of content-sharing times; the number of views; and so on, which are associated with one another, into a RAM (Random Access Memory), a SRAM (Static Random Access Memory), and the like. The details will be described later.

The storage processing unit 101 serves also as a database which, in response to a request from another processing unit, extracts a necessary value from among stored values and outputs the extracted value.

The content registration unit 102 performs registration processing for registering, on the storage processing unit 101, a new content item to be shared. For example, the content registration unit 102 displays a GUI (Graphical User Interface) on a display unit which is not illustrated, and obtains an instruction of the registration processing, from the first user who operates the content managing apparatus 100.

The content analysis unit 103 is a processing unit that analyzes the content item that is newly registered by the content registration unit 102 to generate a metadata item. The details will be described later.

The sharing control unit 104 is a processing unit that determines whether or not the first content item should be shared between the second user and the first user, based on the degree of interest. More specifically, the sharing control unit 104 determines that the first content item should be shared between the first user and the second user when the degree of interest of the second user is higher than or equal to the first threshold determined in advance. The more details will be described later.

The communication unit 105 is a communication interface that connects the content managing apparatus 100 to the recipient content managing apparatus 100a through the communication network 120 such as the Internet or LAN (Local Area Network). It is to be noted that the content managing apparatus 100 is also referred to a sharer content managing apparatus, and the content managing apparatus 100a is also referred to a recipient content managing apparatus, for convenience.

The degree of interest calculating unit 106 is a processing unit that calculates the degree of interest that is an index indicating the interest of the second user in the metadata item held by the first content item, based on the information on the sharing state of the second content item. The details will be described later.

It is to be noted that "to share" in the present invention means to make a content item viewable by specified people. More specifically, this means to make the first content item registered on the sharer content managing apparatus 100 viewable from the second user who uses the recipient content managing apparatus 100a.

In addition, "sharing state" refers to the state in which the first content item held by the first user is viewable by the second user other than the first user.

In addition, the term "the number of content-sharing times" refers to the number of times that a content item is shared, and the term "the number of views" refers to the number of times that the shared content item is viewed. A content item can be shared by a user without being viewed, or the shared content item can be viewed many times, and thus the above-described two terms are distinguished from each other.

In addition, the term "recipient user" refers to a user with whom a content item has been shared previously by the first user. The second user refers to a user who is selected by the sharing control unit 104 from among the recipient users as a target for determining whether or not a content item is to be shared by the first user.

It is possible to implement the content managing apparatus 100 as described above on a general computer which includes a central processing unit, a main storage device, an auxiliary storage device, an input and output device, as so on. In addition, as a content item handled by the content managing apparatus 100, there are: a photograph and video captured by a digital still camera, a digital video camera, a mobile phone, and the like; text information written by a user (posting on a blog, for example); and so on.

Figure 2:
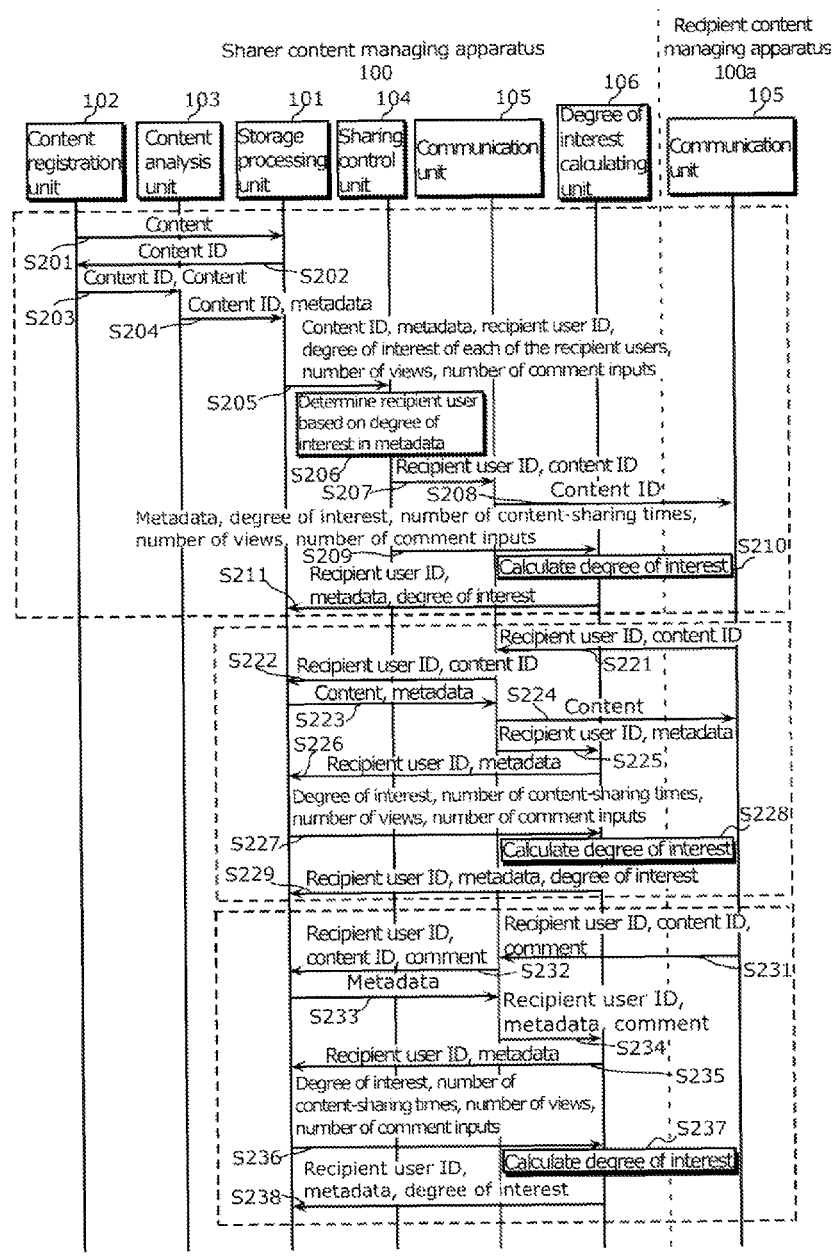
FIG. 2 is a diagram which shows transmitting and receiving data between the functional blocks.

FIG. 2 is a diagram which shows: the transmitting and receiving of data between processing units each included in the content managing apparatus 100; and the transmitting and receiving of data between the sharer content managing apparatus 100 and the recipient content managing apparatus 100a.

The following describes the flow of processes performed by the content managing apparatus 100, with reference to FIG. 1 and FIG. 2.

First, the procedure from registering the first content item to sharing the first content item with the second user will be described.

The storage processing unit 101 is a storage apparatus for storing a content item and a metadata item related to the content item. Here, the metadata item is information indicating an attribute common to plural content items. For example, in the case of a photograph content item, the attributes may include a photograph shooting time, a shooting location, a name of a subject, and so on.

The content registration unit 102 causes the storage processing unit 101 to store the first content item (S201). Upon storing the first content item, the storage processing unit 101 assigns a content ID that is a unique identifier to the stored first content item, and transmits the assigned content ID to the content registration unit 102 (S202). The content registration unit 102 transmits the first content item and the content ID obtained in Step S202 to the content analysis unit 103 (S203).

The content analysis unit 103 analyzes the obtained first content item. In addition, the content analysis unit 103 converts the result of the analysis into a metadata item, and then causes the storage processing unit 101 to store the metadata item and the first content item in association with each other (S204).

Here, when the first content item is a still image, the content analysis unit 103 uses the image-recognition technique to recognize a person or an object included in the first content item, and outputs the result of the recognition as a metadata item. A known technique is used as the image-recognition technique, and the technique is not described here in detail. For example, the detection of a face region may be performed using an discriminator such as Support Vector Machine (SVM), Adaboost, and the like, with a feature value being an input, such as the distance between eyes, the width of a nose, and so on. The human recognition may be performed using a technique of eigenfaces or a technique using Gabor wavelet transform. In addition, the object recognition may be performed using a method of extracting a scale-invariant feature transform (SIFT) feature value from an image and compare the extracted SIFT feature value with an object model database. In addition, when the first content item is a video image, the content analysis unit 103 may use a speech-recognition technique (a technique based on the hidden Markov model, for example), in addition to the image-recognition technique, to recognize a language that is spoken and outputs the language as a metadata item. For example, when the first content item is text, the content analysis unit 103 may use a known natural language processing technique (morphological analysis technique and syntactic parsing technique, and so on) to extract a characteristic language, and output the extracted language as a metadata item. In addition, a user may assign a desired metadata item through a non-illustrated input unit, in addition to the metadata item output by the content analysis unit 103. Furthermore, a metadata item assigned by an image capturing device (time and date, location, image shooting condition, and so on. Exchangeable Image File Format (Exif) may be included, for example) may be assigned, as it is, as a metadata item.

Upon receiving an input of the first content item and the metadata item, the storage processing unit 101 stores the first content item and the metadata item in association with each other. In addition, the storage processing unit 101 outputs, to the sharing control unit 104, information including (i) an identifier (a recipient user ID) for identifying the second user with whom the second content item that is a content item having the same metadata item as the inputted metadata item is shared and who is a user of the recipient content managing apparatus 100a, (ii) the number of content-sharing times that is the number of times that the second content item has been shared previously between the second user and the first user, (iii) the number of views that is the number of times that the second user has viewed previously the second content item, and (iv) the degree of interest of the second user in the metadata item (S205).

Here, the degree of interest in the present embodiment is a value indicating how much the second user is interested in the information indicated by the metadata. It is assumed here that the stronger the interest is, the higher the value of the degree of interest becomes. In the present embodiment, the degree of interest calculating unit 106 calculates the degree of interest based on the number of views of the second content item, the number of comment inputs for the second content item, and so on. The calculation processing performed by the degree of interest calculating unit 106 will be described later.

The sharing control unit 104 determines whether or not the second content item should be shared between the first user and the second user, based on the received recipient user ID and the information on the degree of interest in the metadata item associated with a corresponding one of the recipient user IDs. Through this determination, the sharing control unit 104 determines the recipient user of the content item (S206). When it is determined to share the second content item, the sharing control unit 104 displays, on a non-illustrated display unit, an indication to be shown to the first user for making a final confirmation of intention of executing the sharing. A detailed explanation for the operation in Step S206 will be given later.

When the first user provides, using the non-illustrated input unit, a response indicating that sharing is to be executed, information on the second user and the second content item, in other words, the recipient user ID and the content ID, are output to the communication unit 105 (S207). The communication unit 105 notifies, together with the content ID that is the identifier for identifying the second content item, that the second content item is rendered viewable from the second user, to the recipient content managing apparatus 100a used by the second user (S208). In addition, the communication unit 105 adds 1 to the number of content-sharing times that is the number of times that the second content item is shared between the second user and the first user, and causes the storage processing unit 101 to store the resultant number of content-sharing times.

In addition, the sharing control unit 104 obtains, from the storage processing unit 101: the degree of interest in the metadata item held by the first content item, which is associated with the recipient user ID and stored; the number of content-sharing times of the second content item that is the content item to which the metadata item is assigned; the number of views of the second content item; and the number of comment input times on the second content item, and transmits them to the degree of interest calculating unit 106 (S209).

It is to be noted that, when the second content item includes plural content items including the first content item, the number of content-sharing times of the second content item is a sum of the number of times that the content items included in the second content item are shared between the second user and the first user.

In the same manner as above, the number of views of the second content item is a sum of the number of times that the content items included in the second content item and shared between the second user and the first user are viewed.

In the same manner, the number of comment input times of the second content item is a sum of the number of times that a comment for the content items included in the second content item and shared between the second user and the first user is inputted.

The degree of interest calculating unit 106 calculates, based on the obtained items of information, the degree of the second user's interest in the metadata item held by the first content item, immediately after the first content item is shared (S210), and updates the degree of interest stored in the storage processing unit 101 (S211).

The flow of processes from the registration of the first content item to the sharing of the first content item between the first user and the second user who uses the content managing apparatus 100a has been described above. It is to be noted that, it has been described above that the content managing apparatus 100 asks the first user whether or not a content item can be shared, and the content item is shared when the first user approves the sharing of the content item. However, separately from this flow of the processing, there may be a process in which the first user explicitly causes the first content item to be shared by the second user with whom the first user intends to share the first content item.

The following describes the flow of processes performed by the recipient content managing apparatus 100a, from requesting viewing of a content item to calculating and registering the degree of interest.

Upon receiving the content ID transmitted by the communication unit 105 in Step S208, the recipient content managing apparatus 100a performs display to indicate, to the second user, that the content item is shared. When the second user performs, on the recipient content managing apparatus 100a, input indicating that the shared content item is to be viewed, the recipient content managing apparatus 100a transmits the recipient user ID and the content ID to the communication unit 105 included in the sharer content managing apparatus 100 (S221).

Upon receiving the recipient user ID and the content ID, the communication unit 105 included in the sharer content managing apparatus 100 transmits the recipient user ID and the content ID to the storage processing unit 101 (S222), and receives the first content item identified by the content ID and the metadata item assigned to the first content item, in other words, the metadata item held by the first content item (S223). In addition, the communication unit 105 transmits the first content item obtained from the storage processing unit 101, to the recipient content managing apparatus 100a (S224). Furthermore, the communication unit 105 transmits the metadata item held by the shared first content item and the recipient user ID, to the degree of interest calculating unit 106 (S225). In addition, the communication unit 105 increments, by one, the number of views of the first content item by the second user, which is stored in the storage processing unit 101.

Next, upon receiving the recipient user ID and the metadata item, the degree of interest calculating unit 106 transmits the recipient user ID and the metadata item to the storage processing unit 101 (S226), and obtains, for each of the recipient user IDs, the degree of interest in the metadata item, the number of content-sharing times of the second content item which holds the metadata item, the number of views of the second content item, and the number of comment input times on the second content item, from the storage processing unit 101 (S227).

The degree of interest calculating unit 106 calculates again the degree of interest of the second user in the metadata item held by the first content item, based on these items of information (S228), and causes the storage processing unit 101 to store the degree of interest (S229).

Through the processes described above, the degree of interest, of the second user who uses the content managing apparatus 100a, in the metadata item is updated and registered, based on the request for viewing the content item from the recipient content managing apparatus 100a.

The following describes the flow of processes performed by the recipient content managing apparatus 100a, from receiving a comment input from the second user to calculating and registering the degree of interest.

It is assumed that the second user views the shared first content item and inputs a comment on the first content item, using the recipient content managing apparatus 100a. In this case, the recipient content managing apparatus 100a transmit, to the sharer content managing apparatus 100, the recipient user ID, the content ID, and the comment inputted by the second user (S231).

Upon receiving the recipient user ID, the content ID, and the comment, the communication unit 105 included in the sharer content managing apparatus 100 causes the storage processing unit 101 to store the recipient user ID, the content ID, and the comment (S232). Then, the communication unit 105 receives, from the storage processing unit 101, the metadata item held by the first content item identified by the content ID (S233). Next, the communication unit 105 transmits the recipient user ID, the metadata item, and the comment, to the degree of interest calculating unit 106 (S234). In addition, the communication unit 105 increments, by one, the number of the second user's comment times on the first content item, which is stored in the storage processing unit 101.

The degree of interest calculating unit 106 transmits the recipient user ID and the metadata item to the storage processing unit 101 (S235). Then, the degree of interest calculating unit 106 obtains, for each of the recipient user IDs, the degree of interest on the transmitted metadata item, the number of content-sharing times of the second content item that is the content to which the metadata item is assigned, the number of views of the second content item, and the number of comment input times on the second content item, from the storage processing unit 101 (S236).

The degree of interest calculating unit 106 calculates again the degree of interest of the second user in the metadata item held by the first content item, based on these items of information (S237), and causes the storage processing unit 101 to store the degree of interest (S238).

Through the processes described above, the degree of the second user's interest in the metadata item is updated and registered, based on the comment inputted by the second user.

The following describes information stored in the storage processing unit 101 with reference to FIG. 3 and FIG. 4.

FIG. 3 is a diagram which illustrates a metadata item, a recipient user ID, the number of views, and a comment, as an example of the content information which is associated with a corresponding one of the content IDs, and is stored in the storage processing unit 101.

For example, it is indicated that the first content item whose content ID for identifying a content item is indicated as CID_

00001 is (i) assigned with "Taro" as a metadata item, (ii) shared with the second user whose recipient user ID for identifying a user is indicated as UID_00001, (iii) viewed three times by the second user, and (iv) provided with a comment input of "Way to go! Taro!" from the second user.

FIG. 4 is a diagram which illustrates an example of metadata information including the degree of interest in the metadata item which is registered on the storage processing unit 101. Here, for each of the content items having the same metadata item, the recipient user ID which identifies a user with whom the content item assigned with the metadata item is shared is stored. In addition, for each of the recipient user IDs, a sum of the number of content-sharing times of the content item having the metadata item, a sum of the number of views, a sum of the number of comment input times that is the number of times a comment is inputted, and the degree of interest in the metadata item, which are associated to one another, are stored.

For example, the second content item with which the metadata item indicated as "Taro" is assigned is shared with the second user whose recipient user ID for identifying a user is "UID_0001", and the number of content-sharing times of the second content item is 10 times in total, the number of views is 16 in total, and the number of comment input times is 4 in total. In addition, the second user's degree of interest in the metadata item indicated as "Taro" is 1.8.

The content information shown in FIG. 3 and the metadata information shown in FIG. 4 are associated with each other with the metadata item being a key. More specifically, the storage processing unit 101 is capable of generating a table of metadata information shown in FIG. 4, by counting the content information shown in FIG. 3.

For example, when the second user views the first content item, the communication unit 105 adds one to the number of views included in the content information of the first content item. In response to the above, the storage processing unit 101 adds one to the number of views, by the second user, of the second content item having the metadata item indicated as "Taro" included in the metadata information.

The following describes the processes of calculating the degree of interest performed by the degree of interest calculating unit 106, with reference to FIG. 4 and FIG. 5 (Step S210, Step S228, and Step S237).

The degree of interest calculating unit 106 according to the present embodiment calculates the degree of interest as a value obtained by dividing, by the number of content-sharing time, a sum of a value corresponding to at least one of (i) the number of views, (ii) the number of comment input times, (iii) the amount of view time, and (iv) the number of characters in the comment, of the second user for the second content item.

A more detailed explanation will be given below.

The degree of interest calculating unit 106 calculates the degree of interest using, for example, Expression 1 below. It is to be noted that w denotes a weight coefficient for the number of comment input times.

the degree of interest=(the number of views+the number of comment input times×w)/the number of content-sharing times (Expression 1)

As shown in Expression 1, the degree of interest is calculated such that the larger the number of views and comment times are and the smaller the number of content-sharing times is, the calculated degree of interest is higher.

The degree of interest is calculated by Expression 1 because it is expected that a user having a strong interest in a content item will view the content item for a larger number of times and will be likely to input a comment.

In addition, it is because the user's interest in the shared content item is considered to be low when viewing of, or inputting a comment on, the content item is not carried out after sharing of the content item.

Even when a content item is shared only once, the second user who has a strong interest in the content item is expected to view the content item, input a comment, and then view the content item again for several times. On the other hand, it is likely that the second user who has no interest in the content item never view the content item. Accordingly, it can be said that calculating the degree of interest based on the number of views and the number of comment input times reflects the interest of the second user. It is to be noted that, since a comment is not always inputted, the size of the weight w may be set so as not to exceed the weight of the number of views (=1.0).

For example, it is assumed that a degree of interest for each metadata item shown in FIG. 4 is stored in the storage processing unit 101.

It is assumed, in this state, that the first content item to which the metadata item indicated as "Taro" is assigned is shared with the second user whose recipient user ID is UID_00001, and then the second user views the first content item. Subsequently, the degree of interest calculating unit 106 receives, from the communication unit 105, UID_0001 that is the recipient user ID for identifying the second user and the metadata item indicated as "Taro". After that, the degree of interest calculating unit 106 inquires, to the storage processing unit 101, the number of content-sharing times that is the number of times that the second content item to which the metadata item indicated as "Taro" is assigned is shared between the second user and the first user, the number of views by the second user, and the degree of interest of the second user in the metadata item indicated as "Taro".

FIG. 4 shows that the number of content-sharing times is 10, the number of views is 16, the number of comment input times is 4, and the degree of interest is 1.8, before the sharing this time. Since each of the number of content-sharing times and the number of views is incremented by one due to the sharing and viewing this time, when applying the weight w=0.5 to the above-described expression for calculating the degree of interest, the degree of interest of the second user after the viewing is expressed as:

the degree of interest=(17+4×0.5)/11≈1.72

When the second user who viewed the content item further inputs a comment, the degree of interest is expressed as:

the degree of interest=(17+5×0.5)/11≈1.75

Furthermore, when the second user views again the same content item, the degree of interest is expressed as:

the degree of interest=(18+5×0.5)/11≈1.86

In this case, the degree of interest of the second user in the metadata item indicated as "Taro" is updated from the state shown in FIG. 4 to the state shown in FIG. 5.

The following describes, with reference to FIG. 6 to FIG. 8C, the process of determining a user with whom the first content item should be shared, which is performed by the sharing control unit 104 (Step S206).

The case where the first content item to which the metadata item indicated as "Cooking" is assigned is newly registered by the content registration unit 102 is described here as an example. At this time, the sharing control unit 104 obtains through the processes from Step S201 to Step S205 shown in FIG. 2, (i) the content ID of the first content item that is registered this time, (ii) the associated metadata item ("Cooking"), (iii) the recipient user IDs of the recipient users with whom the second content item to which the metadata item is provided has been shared in the past, and (iv) the degrees of interest each of which is associated with a corresponding one of the recipient user IDs. FIG. 6 shows an example of information used by the sharing control unit 104 in Step S206.

Figure 7:
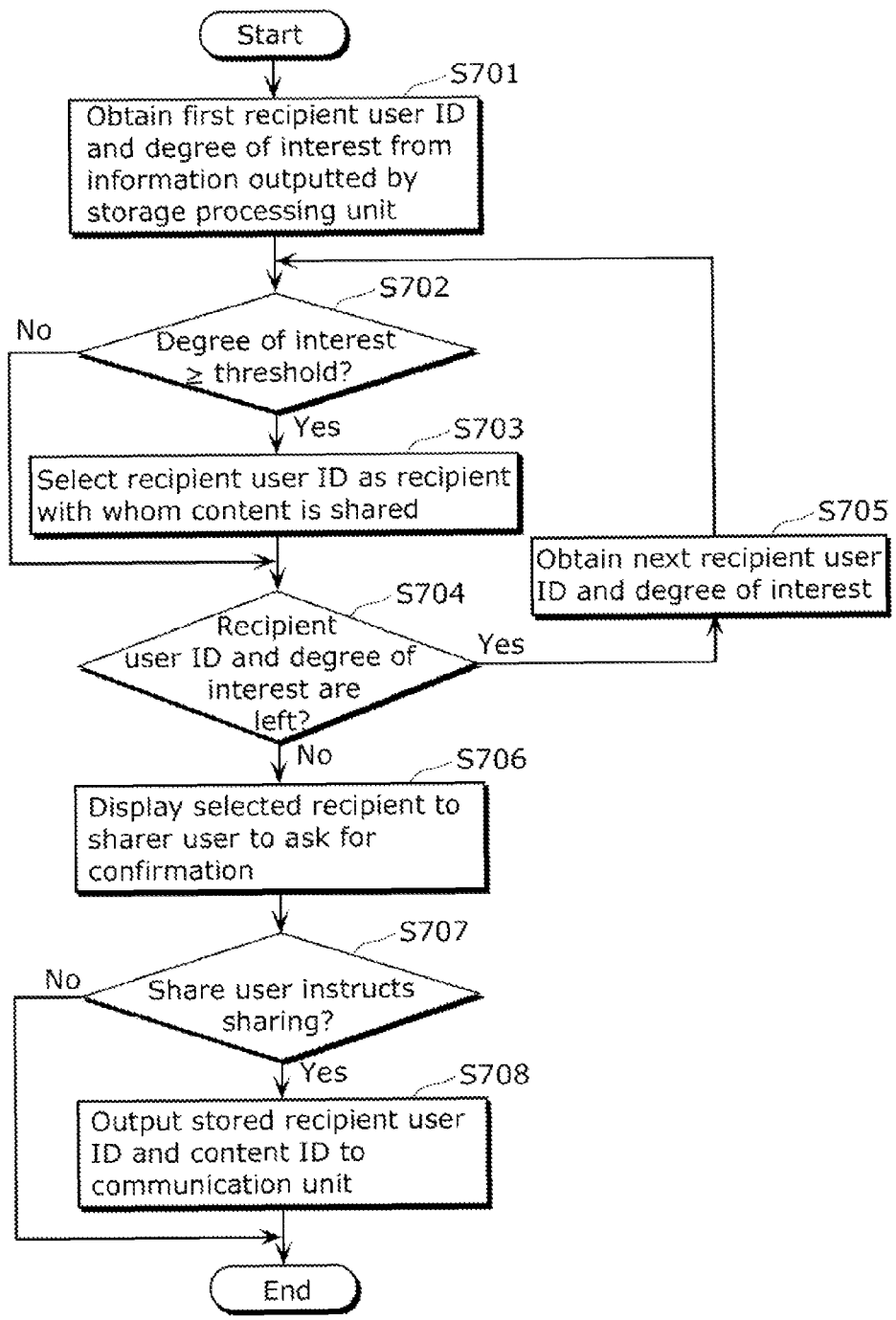
FIG. 7 is a flowchart illustrating operations of the sharing control unit according to Embodiment 1.

FIG. 7 is a flowchart which shows a flow of processes in Step S206, performed by the sharing control unit 104.

As shown in FIG. 6, plural recipient user IDs and degrees of interest are associated in general with a singe metadata item. Accordingly, the sharing control unit 104 obtains one of the recipient user IDs and the associated degree of interest from the plural recipient user IDs which have been obtained (S701). For the obtaining, an arbitrary method can be used such as a method of extracting the recipient user ID and the degree of interest which are stored earliest in the storage processing unit 101, a method of extracting the recipient user ID and the degree of interest which correspond to the first row when the recipient user IDs are rearranged in a lexicographic descending or ascending order, and the like. It is assumed that the recipient user identified by the recipient user ID obtained in the above-described manner is the second user.

Next, the sharing control unit 104 compares the degree of interest with a predetermined threshold (S702). When the degree of interest is a value which is higher than or equal to the threshold (Yes in S702), it is determined that the second user is a user with whom the first content item should be shared by the first user, and the second user is selected as a recipient (S703). On the other hand, when the degree of interest is lower than the threshold (No in Step S702), the process proceeds to Step S704.

Next, the sharing control unit 104 checks whether or not an unprocessed recipient user ID and unprocessed degrees of interest are left among the plural recipient user IDs obtained in Step S205. When an unprocessed recipient user ID and unprocessed degrees of interest are left in Step S704 (Yes in S704), a next recipient user ID and a next degree of interest (for example, the ones corresponding to the next row) are obtained (S705), and the process returns to Step S702 with the user identified by the obtained recipient user ID being the second user.

On the other hand, when an unprocessed recipient user ID and unprocessed degrees of interest are not left (No in S704), the sharing control unit 104 displays an image for asking the first user whether or not the first content item is to be shared with the second user who is identified with the recipient user ID selected in the loop from Step S702 to the Step S704 (S706). Here, when the first user inputs the intention of sharing (Yes in S707), the sharing control unit 104 outputs, to the communication unit 105, the recipient user ID which identifies the second user and the content ID which identifies the first content item (S708). In contrast, when the user inputs the intention of not sharing (No in S707), the sharing control unit 104 ends the process as it is.

A more detailed explanation will be given with reference to FIG. 6 once again.

Given the predetermined threshold is 1.2, the recipient users whose degrees of interest are higher than or equal to the threshold 1.2 are the user indicated by UID_00001 and the user indicated by UID_00002. Accordingly, the sharing control unit 104 selects these two users as the second users, to be the recipients of the first content item identified by the content ID of CID_00010, and displays an image for asking the first user whether or not the first content item is to be shared.

As described above, the content managing apparatus 100 according to the present embodiment calculates the degree of interest in a metadata item based on the number of content views or the number of comment input times of the second user. In addition, the content managing apparatus 100 determines whether or not the content item should be shared with the second user based on the calculated degree of interest, thereby performing sharing control of the content item as an example of the content management. It is therefore possible to determine the recipient of the content item in a manner which reflects the degree of interest of a user with higher accuracy than in the conventional techniques.

It is to be noted that, although the case is explained where a point is added in response to a comment input, as a method of calculating the degree of interest performed by the degree of interest calculating unit 106, a point may be added according to the number of characters in a comment. This is because it is considered that a user who inputs a lengthy comment has a high degree of interest.

In addition, the number of comment input times ×0.5 is added as a point in response to a comment input, in the above-described example. However, it is possible to calculate the degree of interest such that the degree of interest increases according to the number of characters in the inputted comment, by adding the number of comment input times ×0.5 in the case where the number of characters in the inputted comment is less than the predetermined threshold, and adding the number of comment input times ×1.0 in the case where the number of characters in the inputted comment is larger than or equal to the predetermined threshold, for example. In addition, as a method of calculating the degree of interest performed by the degree of interest calculating unit 106, a point may be added according to the amount of view time of the content in the recipient content managing apparatus 100a. For example, upon the end of viewing a content item in the recipient content managing apparatus 100a, the recipient content managing apparatus 100a transmits, to the sharer content managing apparatus 100, information as to the end of viewing the content item. Upon receiving the information, the sharer content managing apparatus 100 registers, on the storage processing unit 101, the period of time from the receipt of a request for viewing the content item to the receipt of the information as to the end of viewing of the content item. Then, the degree of interest calculating unit 106 adds, to the degree of interest, (i) a value obtained by multiplying, by 1.5, the number of views in each of which the amount of view time is longer than or equal to a threshold, and (ii) a value obtained by multiplying, by 1.0, the number of views in each of which the amount of view time is shorter than the threshold, where the predetermined threshold is one minute, thereby enabling calculation of the degree of interest such that the degree of interest increases according to the amount of view time of content.

It is to be noted that, for calculating the degree of interest, it is not necessary to use all of the above-described viewing conditions of the second user (the number of views, the number of comment input times, the amount of view time, and the number of characters in the comment), and the calculation may be carried out based on at least one of the conditions.

In addition, the method of determining whether or not a content item is to be shared, which is preformed by the sharing control unit 104, is explained with an example in which each of the content items is provided with one metadata item. However, in the case where each of the content items is provided with plural metadata items, the determination of whether or not a content item can be shared may be carried out in consideration of the degree of interest in the plural metadata items. It is assumed, for example, when a content item (the content ID is assumed to be CID_00011) having a captured image of a boxed lunch is registered on the content managing apparatus 100 by the first user, a metadata item indicated as "Boxed lunch" is automatically provided to the content item by the content analysis unit 103. In addition, it is assumed that the content item is provided with the metadata item indicated as "Taro" by the first user, because the boxed lunch is given to the first user's child (Taro). In addition, it is assumed that information shown in FIG. 8A is stored in the storage processing unit 101.

At this time, each of the recipient user IDs is associated with two different degrees of interest for two different metadata items; that is, "Boxed lunch" and "Taro". Therefore, it poses a problem that which of the degrees of interest should be used as the "degree of interest" used by the sharing control unit 104 in Step S702.

In view of the above, it can be considered that the degree of interest having the highest value is adopted as the degree of interest to be used in Step S702, among the degrees of interest for the different metadata items of the recipient user. In this case, the degrees of interest associated with the respective recipient user IDs are shown in FIG. 8B. For example, in the case where the predetermined threshold for selecting as a recipient is 1.2, the content item identified by the CID_00011 is shared between the users specified by UID_00001 and by UID_00002. With this, it is possible to implement the sharing control with which a content item is shared with a user having a strong interest in at least one of the plural metadata items.

In addition, it can be considered that the degree of interest having the lowest value is adopted as the degree of interest to be used in Step S702, among the degrees of interest for different metadata items of the recipient user. In this case, the degrees of interest associated with the respective recipient user IDs are shown in FIG. 8C. For example, in the case where the predetermined threshold for selecting as a recipient is 1.2, the content item identified by the CID_00011 is shared only with the user identified by UID_00001. With this, it is possible to implement the sharing control with which, for example, a specified content item provided with the metadata item related to a child is not shared even if the content item has a captured image of a boxed lunch.

It is to be noted that, an example is presented here in which the highest or the lowest value is selected from among the degrees of interest of the recipient user in plural metadata items. However, not limited to the above, any combination of the degrees of interest which is suitable to a purpose may be adopted. For example, an average of the degrees of interest in plural metadata items may be calculated for each of the recipient users, and the calculated average may be adopted as the degree of interest.

More specifically, the sharing control unit 104 may use, as one of the degrees of interest of each of the users when a content item has plural metadata items, one of (i) the highest value among the degrees of interest which each of the users has for different metadata items, (ii) the lowest value among the degrees of interest which each of the users has for different metadata items, and (iii) the average of the degrees of interest which each of the users has for different metadata items.

It is to be noted that the content managing apparatus 100 according to the present embodiment need not necessarily include all of the components shown in FIG. 1.

More specifically, the content managing apparatus 100 is capable of producing the same advantageous effect without the content analysis unit 103, by providing a content item with a metadata item in advance. In such a case, a metadata providing apparatus located outside the content managing apparatus 100 may be used, or the first user may manually input using software provided with an input unit such as a GUI.

In addition, the content managing apparatus 100 is capable of producing the same advantageous effect without the content registration unit 102, by causing the storage processing unit 101 to directly store the content item, using a writing apparatus located outside the content managing apparatus 100 when the storage processing unit 101 is detachable, for example.

In addition, the content managing apparatus 100 is, without the communication unit 105, capable of calculating the degree of interest in the metadata item based on the information directly written into the storage processing unit 101, as described above. Therefore, the sharing control unit 104 is capable of selecting a user with whom a content item is shared, and thus it is possible to produce the same advantageous effect of the invention as in the case where the communication unit 105 is provided.

Embodiment 2

In the present embodiment, another technique of calculating the degree of interest, which is performed by the degree of interest calculating unit, will be described.

The degree of interest calculating unit 106 according to Embodiment 1 calculates the degree of interest based on the number of views of a content item, the number of comment inputs, and the number of content-sharing times.

On the other hand, a degree of interest calculating unit 106A according to the present embodiment calculates the degree of interest as a value obtained by dividing, by the number of content-sharing times, a sum of values each of which corresponds to at least one of (i) a period of time from the point when a content item is shared with each of the users to the point when the content item is viewed for the first time, (ii) a period of time from the point when each of the users confirms that a content item is shared to the point when the content item is viewed for the first time, (iii) a difference obtained by subtracting a value corresponding to the number of negative comments from a value corresponding to the number of positive comments, (iv) a time interval between the point when the content item is viewed and the point when the same content item is viewed next time, (v) a period of time from the point when a content item is viewed to the point when a comment on the content item is inputted, and (vi) a ratio of an amount of view time of a content item to a total amount of view time of all of the content items during a predetermined period of time.

The above-described configuration is for addressing the case where the number of views of a content item and the number of comment input times are insufficient for calculating the degree of interest because it can be said that the degree of interest of the second user who views a content item immediately after viewing the content item is high even if the second user has viewed the content item only once, and it cannot be said that the degree of interest of the second user is high when a negative comment is inputted even if the second user has inputted comments several times.

A more detailed explanation will be given below.

Figures 9, 10:
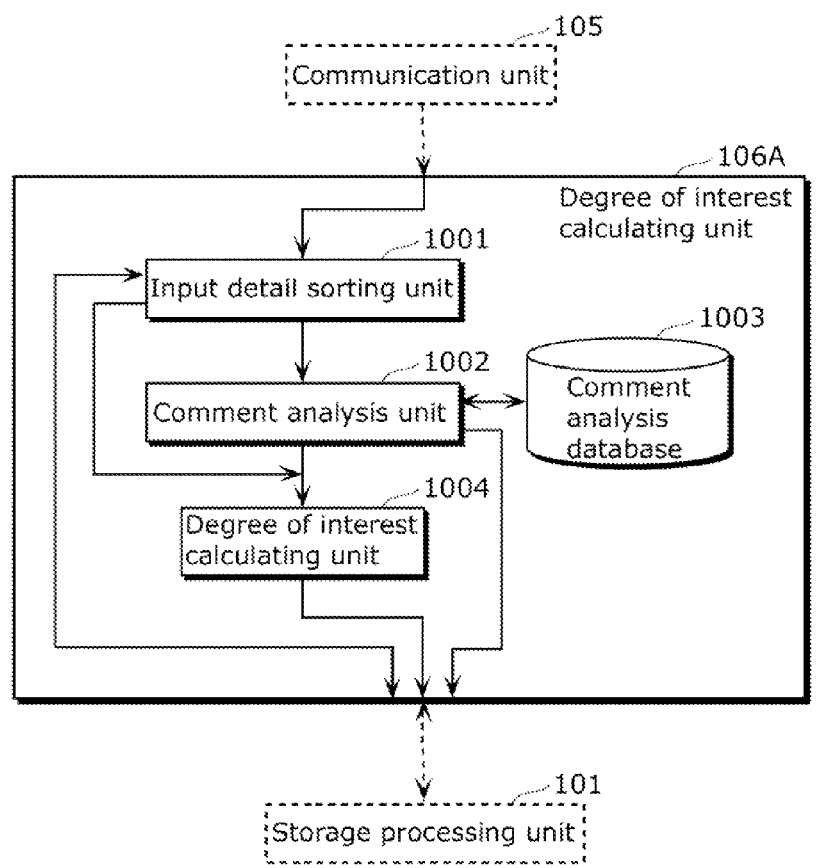
FIG. 9 is a diagram illustrating another example of the content related information according to Embodiments 1 to 5 of the present invention.
FIG. 10 is a block diagram illustrating a functional configuration of an interest degree calculating unit according to Embodiment 2 of the present invention.

FIG. 9 is a diagram which illustrates an example of metadata item, the recipient user ID of the second user, the time and date of sharing, the number of views and the time and date of viewing by the second user, a comment inputted by the second user, and the time and date of inputting the comment, which are stored, in association with the content ID, in the storage processing unit 101 included in the content managing apparatus according to the present embodiment.

According to this example, it is indicated that: the metadata item indicated as "Taro" is assigned to the first content identified by the content ID indicated as CID_00001; the first content item is shared at 15:30 on Apr. 2, 2010 between the first user and the second user who is identified by the recipient user ID indicated as UID_00001; the second user viewed the first content item three times in total, at 17:25 on Apr. 2, 2010, 9:18 on Apr. 3, 2010, and 12:40 on Apr. 28, 2010; and the comment shown in the diagram was inputted at 17:35 on Apr. 2, 2010.

It is to be noted that the second user is shown as only a single person in the example illustrated in FIG. 9. However, when the content item is shared with plural second users, the rows shown under the user ID are generated for each of the second users. In addition, in the example illustrated in FIG. 9, all of the rows in the second column in which values corresponding one-to-one to the items shown in the first column are filled with values. However, in the case where the second user has not yet viewed the content item or inputted a comment, the second column includes a blank space in the rows corresponding to the time and date of viewing and the rows shown under the time and date of viewing.

The following describes, with reference to FIG. 10, the configuration of the degree of interest calculating unit 106A according to the present embodiment. The degree of interest calculating unit 106A according to the present embodiment includes: an input detail sorting unit 1001; a comment analysis unit 1002; a comment analysis database 1003; a degree of interest calculating unit 1004. It is to be noted that the comment analysis database 1003 may be disposed in the storage processing unit 101.

The input detail sorting unit 1001 sorts information obtained from the communication unit 105, by determining whether or not the information is obtained through a comment input. In addition, when the information is obtained through a comment input, the input detail sorting unit 1001 transmits the comment data to the comment analysis unit 1002, and when the information is other than a comment, the input detail sorting unit 1001 transmits the obtained information to the degree of interest calculating unit 1004.

The comment analysis unit 1002 analyzes the comment data using the comment analysis database, and transmits the result of analysis to the degree of interest calculating unit 1004.

The comment analysis database 1003 is a database which stores (i) a keyword, and (ii) label information indicating whether the keyword consists of a positive expression (like, cool, and so on) or a negative expression (dislike, unpretty, and so on).

The degree of interest calculating unit 1004 calculates the degree of interest based on the information transmitted by each of the processing units, and causes the storage processing unit 101 to store the degree of interest.

The degree of interest calculating unit 106A according to the present embodiment calculates the degree of interest using Expression 2 below.

the degree of interest=(viewing condition point+comment detail point/the number of content-sharing times (Expression 2)

It is to be noted that, as the viewing, condition point, the point to be added is changed according to the period of time from sharing to viewing, the period of time from the previous viewing to viewing this time, and the details of the comment.

The reason for calculating the degree of interest using this expression is that, when the second user has a strong interest, it is expected that (i) the period of time from the point when a content item is shared to the point when the content item is viewed is short, (ii) the content item is viewed many times during a short period of time, or (iii) a positive comment is inputted.

First, calculation of the viewing condition point in consideration of (i) the period of time from the point when a content item is shared to the point when the content item is viewed will be explained.

It can be generally said that the degree of interest of the second user is higher as the period of time from the point when the sharer content managing apparatus 100 shares a content item to the point when the content item is viewed at the recipient content managing apparatus 100a is shorter. When notified by the communication unit 105 that a request for viewing is issued by the second user, the input detail sorting unit 1001 obtains, from the storage processing unit 101, (i) the time and date of sharing of the content item that is a target of the request, and (ii) the time and date of viewing this time which is stored already in the storage processing unit 101, and transmits (i) and (ii) to the degree of interest calculating unit 1004.

The degree of interest calculating unit 1004 assigns 2.0 to a weight (the first weight) when the period of time from the time and date of sharing to the time and date of viewing is shorter than a first predetermined threshold (5 hours, for example). In addition, the degree of interest calculating unit 1004 assigns 1.5 to a weight (the second weight) when the period of time from the time and date of sharing to the time and date of viewing is longer than the first predetermined threshold and shorter than a second predetermined threshold (24 hours, for example). Furthermore, the degree of interest calculating unit 1004 assigns 1.0 to a weight (the third weight) when the period of time from the time and date of sharing to the time and date of viewing is longer than the second predetermined threshold. Subsequently, the viewing condition point is calculated by summing all of the values resulting from multiplying, by weight, the number of views corresponding to each of the viewing conditions.

Here, "the number of views corresponding to each of the viewing conditions" is the number of times a content item is viewed during a period determined in association with of the each weight.

In the example of FIG. 9, the weight is 2.0 for the content item identified by the content ID CID_00001 because the period of time from the time and date of sharing to the time and date of the first viewing is 1 hour and 55 minutes. In addition, since the period of time from the time and date of sharing to the time and date of the second viewing is longer than or equal to 5 hours and shorter than 24 hours, the weight is 1.5. Furthermore, since the period of time from the time and date of sharing to the time and date of the third viewing is longer than or equal to 24 hours, the weight is 1.0. In addition, during each of the periods corresponding to the above-described three different weights, the number of views is one. Accordingly, the viewing condition point is calculated to be 4.5 points according to 2×1+1.5×1+1.0×1.

Next, the viewing condition point in consideration of the period of time from the previous viewing to the viewing this time will be explained.

It can be generally said that the degree of interest of the second user is higher as the period of time from the previous viewing to the viewing this time is shorter. In view of the above, when notified by the communication unit 105 that a request for viewing is issued by the second user, the input detail sorting unit 1001 obtains, from the storage processing unit 101, (i) the time and date of the previous viewing and (ii)

the time and date of the viewing this time which is already stored, and transmits (i) and (ii) to the degree of interest calculating unit 1004.

The degree of interest calculating unit 1004 assigns 1.5 to the weight when the period of time from the time and date of the previous viewing to the time and date of the viewing this time is shorter than a predetermined threshold (24 hours, for example). In addition, 1.0 is assigned to the weight when the period of time from the time and date of the previous viewing to the time and date of the viewing this time is longer than the predetermined threshold. Subsequently, the viewing condition point is calculated by summing all of the values resulting from multiplying, by weight, the number of views (the definition is the same as described above) corresponding to each of the viewing conditions.

More specifically, for the second content item having the same metadata item as the metadata item held by the first content item that is shared with the second user, a weight is calculated, for each time and date of viewing, in association with the period of time from the time and date of viewing this time to an immediately previous time and date of viewing is calculated. The viewing condition point is calculated by summing, for each time and date of viewing, the value obtained by multiplying, by weight, the number of views at each time and date of viewing during the period associated with the weight.

In the example of FIG. 9, when the second viewing is performed, the period of time from the time and date of the previous viewing (the time and date of viewing (1)) to the time and date of the viewing this time (the time and date of viewing (2)) is 15 hours and 53 minutes, which is shorter than the predetermined threshold (24 hours) and thus 1.5 is assigned to the weight. Likewise, in the example of FIG. 9, when the third viewing is performed, the period of time from the time and date of the previous viewing (the time and date of viewing (2)) to the time and date of the viewing this time (the time and date of viewing (3)) is 24 dates, 3 hours, and 22 minutes, which is longer than the predetermined threshold and thus 1.0 is assigned to the weight. In addition, during each of the periods determined in association with the above-described three different weights, the number of views is one. Accordingly, the viewing condition point is calculated to be 2.5 points according to 1.5×1+1.0×1. The following describes the comment detail point in consideration of the details of a comment.

When the details of a comment inputted by the second user includes a positive expression (cute, cool, good, nice, and so on) or a negative expression (unpretty, bad, and so on), it can be said that the degree of interest of the second user is high. In view of the above, when notified, by the communication unit 105, that a comment is inputted by the second user, the input detail sorting unit 1001 transmits comment data to the comment analysis unit 1002. The comment analysis unit 1002 analyzes the comment data using known natural language processing techniques such as the morphological analysis, and examines whether or not the comment data includes a keyword registered, as the positive expression or the negative expression, on the comment analysis database 1003.

The comment analysis unit 1002 causes the storage processing unit 101 to store: information indicating positive when the positive expression is included in the comment data; or information indicating negative when the negative expression is included in the comment data, in association with the comment data.

The degree of interest calculating unit 1004 obtains, from the storage processing unit 101: the number of positive comment times, the number of negative comment times, and the number of comment input times which are neither positive nor negative, in other words, the number of comment input times of which a matching keyword is not stored in the comment analysis database. Subsequently, the comment detail point is calculated by summing the value obtained by multiplying the value of the number of positive comment times by weight 1.5, the value obtained by multiplying the value of the number of negative comment times by weight −1.0, and the number of comment input times which are neither positive nor negative.

For example, given that the number of comment input times including a positive expression is 3, the number of comment input times including a negative expression 2, and the number of comment input times which are neither positive nor negative is 3, the comment detail point is calculated to be 1.5×3+(−1.0)×2+3=5.5.

It is to be noted that, a period of time from the point when the second user confirms that "a content item is newly shared" in the recipient content managing apparatus 100*a* to the point when the content item is actually viewed may be used for the period of time from sharing to viewing, instead of the period of time from the time and date when sharing process is performed by the sharer to actual viewing. The confirming that "a content item is newly shared" may be performed at the time when a message that "a content item is newly shared by Mr. XX" is displayed on an initial screen, after the power of the recipient content managing apparatus 100*a* is turned on or the recipient content managing apparatus 100*a* is recovered from a standby state, for example. This is directed to preventing the degree of interest from simply decreasing when the second user cannot use the recipient content managing apparatus 100*a* for a long period of time for certain reasons (for example, due to traveling and the like).

In addition, the degree of interest may be calculated such that the degree of interest of the second user is higher as the period of time from viewing to inputting a comment is shorter, using the time and date of viewing and the time and date of inputting a comment shown in FIG. 9.

Furthermore, the degree of interest may be calculated such that the degree of interest of the second user is higher as the ratio of the period of view time of the content item this time to the period of time for viewing a variety of content items by the second user using the recipient content managing apparatus 100*a* is higher. The reason for the above is that the degree of concentration of the second user's interest differs between the case where the second user views only the content item shared this time for two minutes and the case where the second user views a variety of content items including the content item shared this time for 30 minutes, and it can be said that the degree of interest is higher in the former case. For the above-described calculation, the recipient content managing apparatus 100*a* may transmit, to the sharer content managing apparatus 100, a period of time from the start to the end of a content viewing operation performed by the recipient content managing apparatus 100*a*, together with the information of an end of content viewing at the recipient content managing apparatus 100*a*, for example. The period of time from the start to the end of a content viewing operation can be calculated using the time when the power of the content managing apparatus 100 is turned off, the time when the content managing apparatus 100 is shifted to the standby state, the time of the last operation in the case where the content managing apparatus 100 has not been used by the user for a while, and so on.

Further, it is not necessary to use all of the above-described viewing conditions of the second user (the period of time from sharing to viewing, the period of time from the previous viewing to viewing this time, the details of the comment, the period of time from viewing to inputting a comment, the ratio of the period of time for viewing the content item this time to the period of time for viewing a variety of content items) for calculating the degree of interest, and the calculation may be performed based on at least one of the viewing conditions.

As described above, the degree of interest calculating unit 106A included in the content managing apparatus according to the present embodiment performs sharing control by calculating the degree of interest as a value obtained by dividing, by the number of content-sharing times, a sum of values each of which corresponds at least one of (i) the period of time from the point when the second content item is shared between the second user and the first user to the point when the second user views the second content item for the first time, (ii) the period of time from the point when the second user confirms the sharing state of the second content item between the second user and the first user to the point when the second user views the second content item for the first time, (iii) the difference obtained by subtracting a value corresponding to the number of negative comments from a value corresponding to the number of positive comments, which are inputted by the second user for the second content item, (iv) the period of time from the point when the second user views the second content item to the point when the second user views the same second content item next time, (v) the period of time from the point when the second user views the second content item to the point when the second user inputs a comment on the second content item, and (vi) the ratio of the amount of view time of the second content item by the second user to a total amount of view time of all of the content items by the second user during a predetermined period of time.

According to the configuration described above, it is possible to determine a recipient of a content item more properly, by considering the peripheral information having strong relativity to the degree of interest of the second user; that is, the time information on the viewing operation performed by the second user. In addition, it is possible to accurately reflect the degree of interest of the second user, by using, in the calculation of the degree of interest, the information explicitly indicated by the second user; that is, the details of the comment.

Embodiment 3

In the present embodiment, another technique of sharing control performed by the sharing control unit will be described.

The sharing control unit 104 according to Embodiment 1 asks the first user whether or not a content item can be shared with the second user whose degree of interest is higher than or equal to a predetermined threshold. Here, it is effective to automatically perform, without asking the first user, the content sharing with the second user whose interest is especially high. In view of the above, the sharing control unit according to the present embodiment implements automatic content sharing with the second user whose degree of interest is especially high.

Figure 11:
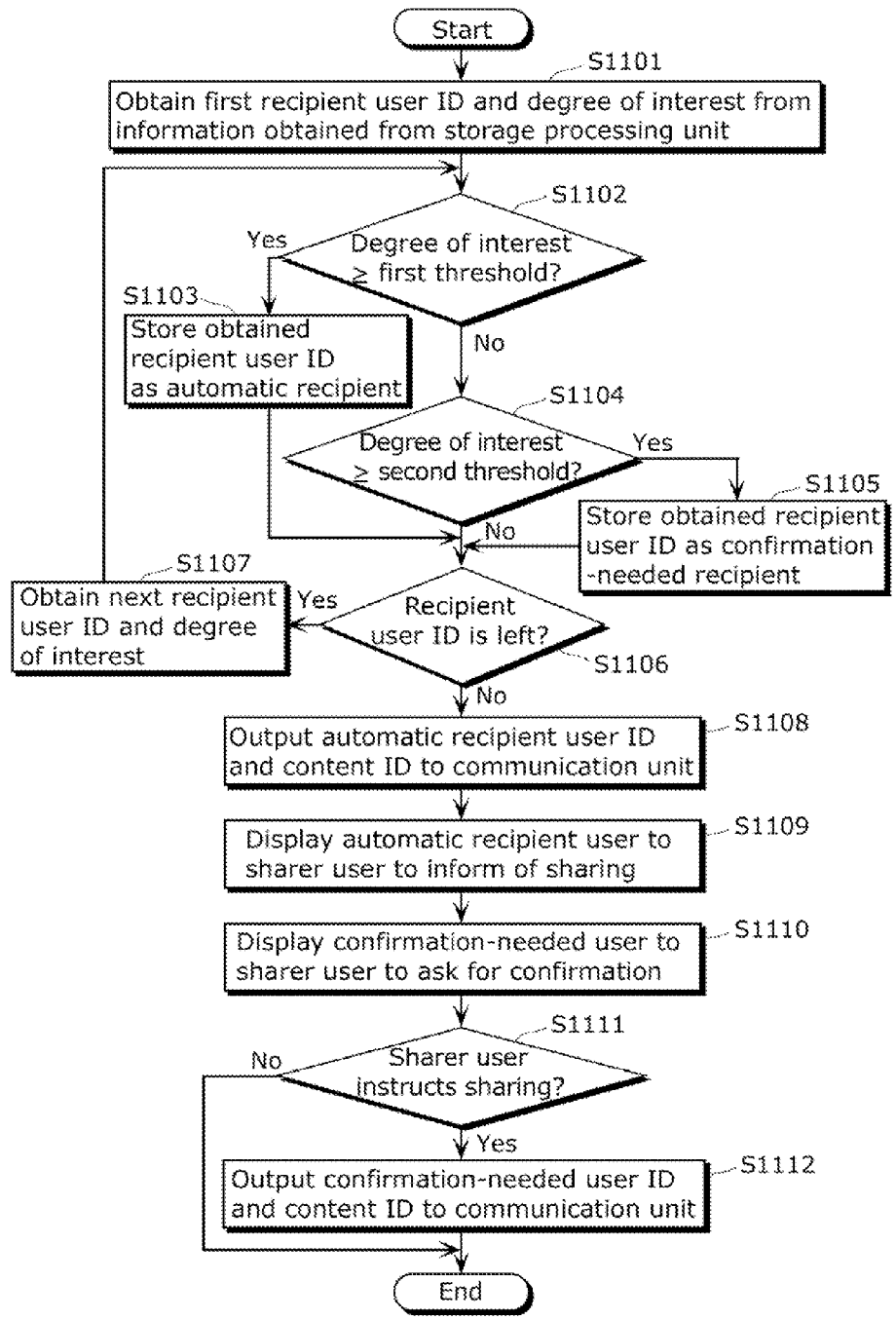
FIG. 11 is a flowchart illustrating operations of the sharing control unit according to Embodiment 3 of the present invention.

FIG. 11 illustrates the flow of processes performed by the sharing control unit according to the present embodiment. The sharing control unit according to the present embodiment is identical to the sharing control unit 104 according to Embodiment 1 in that the sharing control unit obtains: the content ID of the first content item which is newly registered; a metadata item assigned to the first content item; and plural recipient user IDs and the degrees of interest which are associated with the metadata item.

First, the sharing control unit extracts a first recipient user ID arbitrary selected (by selecting the first row, for example) from among the obtained plural recipient user IDs, and the degree of interest associated with the selected recipient user ID (S1101). The recipient user identified by the recipient user ID is the second user.

Next, the sharing control unit compares the degree of interest with a predetermined first threshold (S1102). When the degree of interest is higher than or equal to the first threshold (Yes in S1102), it is determined that the second user identified by the recipient user ID corresponding to the degree of interest should be selected as a recipient for the automatic sharing this time (S1103).

On the other hand, when the degree of interest is lower than the first threshold in Step S1102 (No in S1102), the sharing control unit compares the degree of interest with a predetermined second threshold (S1104). When the degree of interest is higher than or equal to the second threshold (YES in S1104), it is determined that the second user identified by the recipient user ID corresponding to the degree of interest should be selected as a confirmation-needed recipient (a recipient requiring confirmation with the user) (S1105). On the other hand, when the degree of interest is lower than the second threshold (No in S1104), the process proceeds to Step S1106.

Next, the sharing control unit examines whether or not an unprocessed recipient user ID is left among the obtained recipient user IDs (S1106). When the unprocessed recipient user ID is left (Yes in S1106), the sharing control unit obtains the next user ID and the degree of interest corresponding to the nest user ID (S1107), and the process proceeds to Step S1102. On the other hand, when the unprocessed recipient user ID is not left (No in S1106), the sharing control unit outputs, to the communication unit, the user ID selected as an automatic recipient and the content ID of the newly registered content item (S1107).

Next, the sharing control unit causes the first content item to be shared between the first user and the second user determined to be selected as the automatic recipient, and displays, to the first user, an image for informing that the content item has been automatically shared (S1109).

Next, the sharing control unit displays, to the first user, an image for asking whether or not the first content item is to be shared with the second user determined to be selected as the confirmation-needed recipient (S1110). Here, when the first user provides an answer indicating the intention of sharing (Yes in S1111), the sharing control unit outputs, to the communication unit 105, the recipient user ID which identifies the second user and the content ID which identifies the first content item (S1112). As a result, the first content item is shared between the first user and the second user. In contrast, when the user provides an answer indicating the intention of not sharing (No in S1111), the sharing control unit ends the process as it is.

More specifically, the sharing control unit determines whether or not the degree of interest of each of the users is higher than or equal to the predetermined first threshold, and shares a content item, in a first mode, with a user whose degree of interest is higher than or equal to the first threshold. The sharing control unit determines whether or not the degree of interest of each of the users whose degree of interest is lower than the first threshold is higher than or equal to the predetermined second threshold, and shares a content item, in a second mode different from the first mode, with a user whose degree of interest is higher than or equal to the second threshold.

Here, as the first mode, the sharing control unit shares a content item with a user whose degree of interest is higher than or equal to the predetermined first threshold, without asking the first user who is a sharer of the content item whether or not the content item can be shared. In addition, as the second mode, the sharing control unit asks the first user whether or not a content item can be shared, and shares, only when receiving a sharing instruction, the content item with a user whose degree of interest is higher than or equal to the predetermined second threshold and lower than the first threshold.

In other words, the sharing control unit determines whether or not the degree of interest of the second user is higher than or equal to the predetermined first threshold, and determines that the first content item should be shared between the first user and the second user in the first mode when the degree of interest is higher than or equal to the first threshold. In addition, the sharing control unit determines whether or not the degree of interest of the second user whose degree of interest is lower than the first threshold, is higher than or equal to the second threshold. When the degree of interest is lower than the first threshold and higher than or equal to the second threshold, the sharing control unit determines that the first content item should be shared between the first user and the second user in the second mode different from the first mode.

Here, as the first mode, the sharing control unit may cause the first content item to be shared between the first user and the second user without asking the first user. In addition, as the second mode, the sharing control unit may cause the first content item to be shared between the first user and the second user only when an answer instructing sharing of the first content item is received after asking the first user.

Figures 12A, 12B:
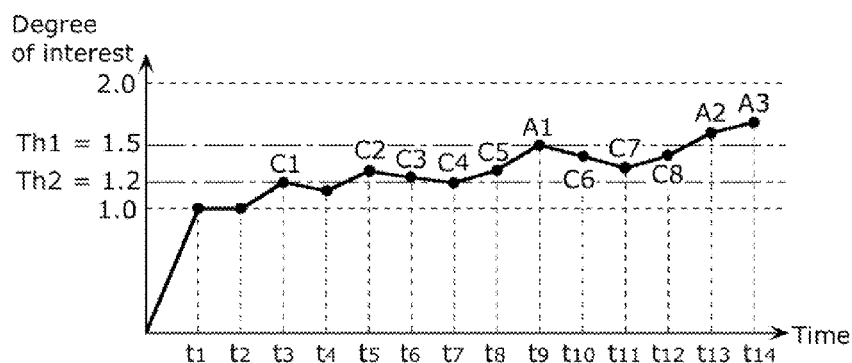
FIG. 12A is a diagram illustrating an example of transition of content sharing, viewing operation, and a degree of interest according to Embodiments 3 of the present invention.
FIG. 12B is a diagram illustrating the transition of the degree of interest illustrated in FIG. 12A.

The following is a specific example for explaining the above-described process. FIG. 12A shows the number of views, the number of comment input times, the degree of interest, and a point of time, which are updated according to a recipient user's operation (viewing or comment) in the case where a content item to which a specified metadata item is assigned is shared with the recipient user. For example, at a point of time t1, the user viewed the shared content item, and thus the number of views is 1. Next, at a point of time t2, the user viewed a new shared content item (indicated by that the number of content-sharing times increased from 1 to 2) to which the same metadata item is assigned, and thus the number of views is two. Next, at a point of time t3, the user commented on the shared content item, and thus the number of comment input times is 1. In addition, the degree of interest increased to 1.25.

The calculation of the degree of interest is carried out using the expression described in Embodiment 1. In addition, the degree of interest immediately after sharing is omitted from the example shown in FIG. 12A for the purpose of simple description, under the premise that "there inevitably is a viewing operation between sharing and sharing".

In addition, FIG. 12B illustrates a graph indicating the transition of the degree of interest illustrated in FIG. 12A. When assigning 1.5 to the first threshold Th1 and 1.2 to the second threshold Th2 in the above description, the degree of interest indicates higher than or equal to Th1 at points A1 to A3 on the graph. These degrees of interest are used as criteria to determine the sharing control during the period of time from the point when each of the degrees of interest is calculated to the point when the next content registration is performed. As a result, the automatic sharing is performed.

Likewise, points C1 to C8 are present in a region in which the degree of interest is higher than or equal to the threshold Th2 and lower than Th1 on the graph. These degrees of interest are used as criteria to determine the sharing control during the period of time from the point when each of the degrees of interest is calculated to the point when the next content registration is performed. As a result, the confirmation of sharing is performed with the first user.

As described above, the content managing apparatus according to the present embodiment performs the automatic content sharing with the recipient user whose degree of interest is especially high. The content sharing performed based on the conventional techniques has a choice between only two options; that is, sharing or not sharing. However, according to the present embodiment, it is possible to perform delicate sharing control such as performing the automatic content sharing according to the degree of interest and the confirming of content sharing with the first user.

Embodiment 4

In the present embodiment, yet another technique of sharing control performed by the sharing control unit will be described.

The sharing control unit according to Embodiment 3 performs the automatic sharing when the degree of interest is higher than or equal to the first threshold. On the other hand, the sharing control unit according to the present embodiment causes a content item to be shared with a recipient user whose degree of interest has continuously increased more than or equal to a predetermine number of times, without asking the first user of the content item whether or not the content item can be shared. In addition, the sharing control unit according to the present embodiment does not cause a content item to be shared with a recipient user whose degree of interest has continuously decreased more than or equal to a predetermine number of times even when the degree of interest of the recipient user is high.

The reason for the above is that, when the degree of interest has decreased continuously, the interest of the recipient user is likely to be decreased more than indicated by the value of the degree of interest. Thus, even when the value of the degree of interest is higher than or equal to the threshold for determining the automatic sharing, continuing to perform the automatic sharing brings about the possibility of annoying the recipient user. The content managing apparatus according to the present embodiment is directed to address such a case as described above.

The following describes the function of each of the processing units according to the present embodiment, focusing on points which differ from the above-described embodiments.

Figure 14:
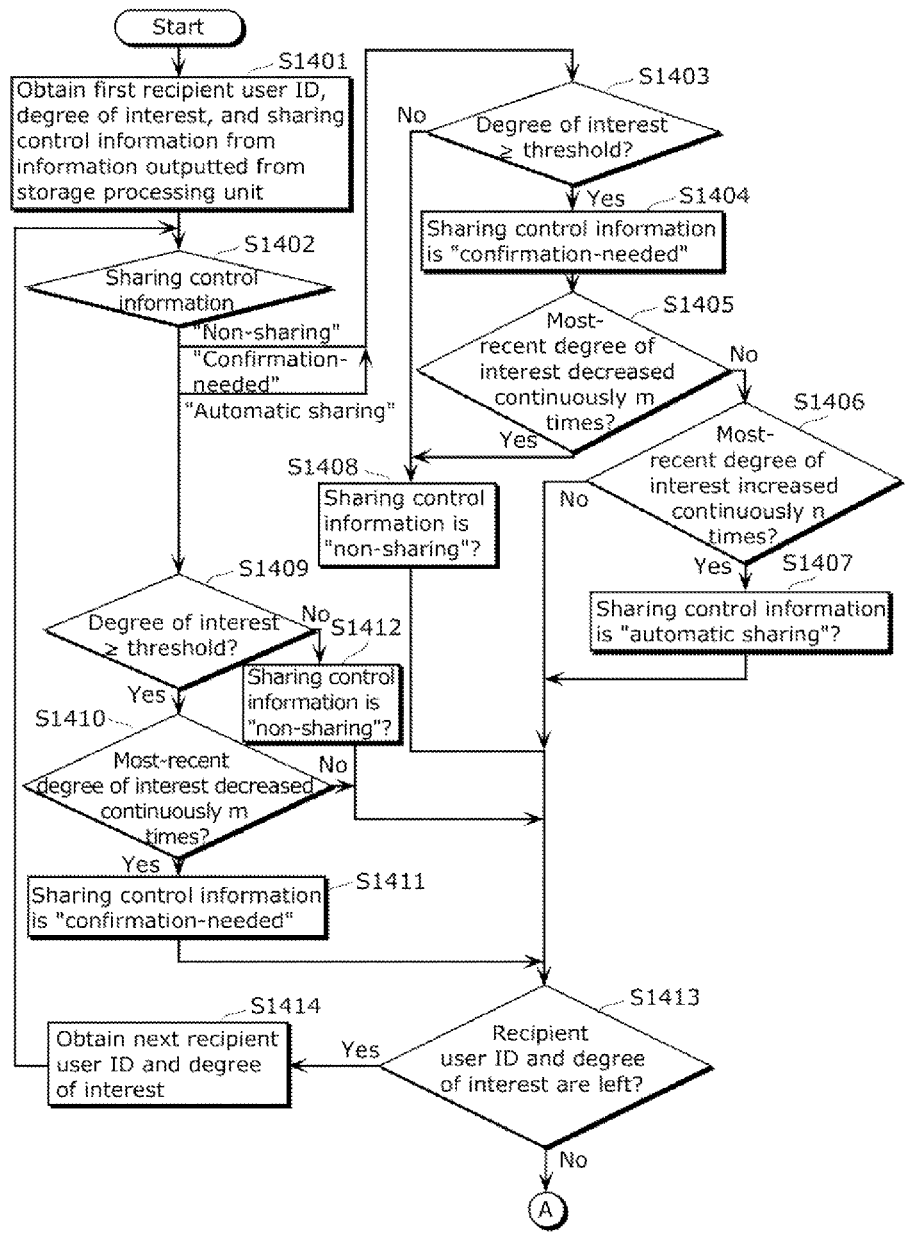
FIG. 14 is a flowchart illustrating operations of a sharing control unit according to Embodiment 4 of the present invention.
Figure 15:
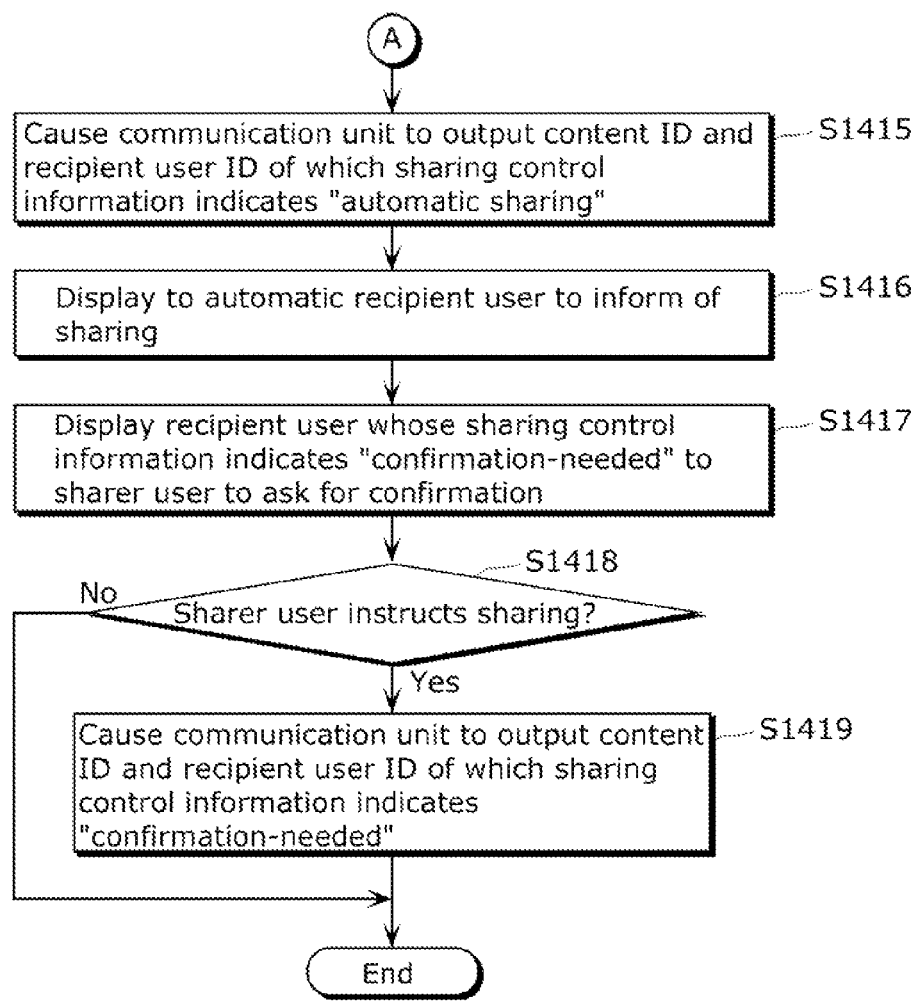
FIG. 15 is another flowchart illustrating operations of the sharing control unit according to Embodiment 4 of the present invention.

The sharing control unit according to the present embodiment, every time the degree of interest of the second user on a metadata item is calculated by the degree of interest calculating unit 106, updates the degree of interest of the second user stored in the storage processing unit 101, using the calculated degree of interest. In addition, the sharing control unit according to the present embodiment updates "sharing control information" for identifying the method of controlling the sharing, with the second user, of a content item to which the metadata item is assigned (see FIG. 13). The storage processing unit 101 stores, as the sharing control information, either one of the values of "non-sharing", "confirmation-needed" (need to ask the first user whether or not to share a content item), and "automatic sharing". FIG. 14 and FIG. 15 illustrate the flow of processes performed by the sharing control unit according to the present embodiment.

First, the sharing control unit obtains: a content ID of a newly registered first content item; a metadata item assigned to the first content item; recipient user IDs each of which identifies a corresponding one of plural recipient users with whom a content item having a metadata item identical to the metadata item assigned to the first content item is shared by the first user in the past; the degree of interest of each of the recipient users on the metadata item held by the first content item; sharing control information of each of the recipient users on the metadata item held by the first content item. It is to be noted that, it is necessary to receive the information on the degree of interest according to the present embodiment, for the most-recent predetermined number of times; that is, for (max (m, n)) times, using m and n which will be described later.

Next, the sharing control unit extracts a first recipient user ID arbitrary selected (by selecting the first row, for example) from among the obtained plural recipient user IDs, and the degree of interest associated with the selected recipient user ID (S1401). The recipient user identified by this recipient user ID is determined as the second user.

Next, the control performed by the sharing control unit branches out according to the value of the sharing control information (S1402). More specifically, when the sharing control information of the second user is "non-sharing" or "confirmation-needed", the process proceeds to Step S1403, and when the sharing control information of the second user is "automatic sharing", the process proceeds to Step S1409.

In Step S1403, the sharing control unit compares the degree of interest with a predetermined threshold. When the degree of interest is lower than the threshold (No in S1403), the sharing control unit updates the sharing control information to "non-sharing" (S1408). On the other hand, when the degree of interest is higher than or equal to the threshold, the sharing control unit updates the sharing control information to "confirmation-needed" (S1404).

Next, the sharing control unit examines whether or not the degree of interest information has continuously decreased for the most recent m times (S1405). When the degree of interest has continuously decreased (Yes in S1405), the sharing control unit updates the sharing control information of the second user to "non-sharing" (S1408). On the other hand, when the degree of interest has not continuously decreased (No in S1405), the sharing control unit examines whether or not the degree of interest of the second user on the metadata item has continuously increased for the most recent n times (S1406). When the degree of interest has continuously increased (Yes in S1406), the sharing control unit updates the sharing control information of the second user to "automatic sharing" (S1407). On the other hand, when the degree of interest has not continuously increased (No in S1406), the sharing control unit proceeds to the process of Step S1413.

In Step S1409, the sharing control unit compares the degree of interest with a predetermined threshold. When the degree of interest is lower than the threshold (No in S1409), the sharing control unit updates the sharing control information of the second user to "non-sharing" (S1412). On the other hand, when the degree of interest is higher than or equal to the threshold (Yes in S1409), the sharing control unit examines whether or not the degree of interest has continuously decreased for the most recent m times (S1410). As a result, when the degree of interest has continuously decreased (Yes in S1410), the sharing control unit updates the sharing control information of the second user to "confirmation-needed" (S1411). On the other hand, when the degree of interest has not continuously decreased (No in S1410), the sharing control unit proceeds to the process of Step S1413.

When an unprocessed recipient user ID is left among the recipient user IDs obtained in Step S1413 (Yes in S1413), the sharing control unit obtains the next recipient user ID and the degree of interest (S1414). Next, the process proceeds to S1402 with the recipient user identified by the recipient user ID being the second user. On the other hand, when there is not another recipient user ID and the degree of interest (No in as1413), the sharing control unit proceeds to the process of Step S1415 illustrated in FIG. 15.

The sharing control unit causes the communication unit 105 to output the content ID and the recipient user ID of the second user whose sharing control information indicates "automatic sharing", to the content managing apparatus 100a (S1415). In addition, the sharing control unit displays, to the first user, an image for informing that the content item has been automatically shared (S1416).

Next, the sharing control unit displays, to the first user, an image for asking whether or not a content item is to be shared with the second user whose sharing control information indicates "confirmation-needed" (S1417). Here, when the first user provides an answer indicating the intention of sharing (Yes in S1418), the sharing control unit causes the communication unit 105 to output, to the content managing apparatus 100a, the recipient user ID which identifies the second user whose sharing control information indicates confirmation-needed and the content ID of the first content item (S1419). In contrast, when the user provides an answer indicating the intention of not sharing (No in S1418), the sharing control unit ends the process.

The following is a specific example for explaining the above-described process.

FIG. 16 illustrates an extended example of the example shown in FIG. 12A. It is to be noted that, although the point of time is omitted from description, it is assumed that the recipient user's operations are aligned from top down in chronological order in the table.

From the point onward indicated by P2 in FIG. 16, a new content item is shared with no viewing operation performed by the recipient user (the number of content-sharing times 8 to 13). Accordingly, in the fields of the "recipient user's operation", a symbol "-" which indicates that nothing has been done is denoted.

Given that the predetermined threshold is 1.2, the degree of interest fluctuates around 1.2 in the beginning. As a result, the value which is set to the sharing control information switches between the "confirmation-needed" and the "non-sharing". However, from the point indicated by P1 in the diagram, the degree of interest shows a monotonic increase. Accordingly, in the case where n=4, the sharing control unit updates the sharing control information to the "automatic sharing", at a point 4 times subsequent to the point indicated by P1. In addition, from the point indicated by P2 in the diagram, the degree of interest shows a monotonic decrease.

Accordingly, in the case where m=3, the sharing control unit updates the sharing control information to the "confirmation-needed", at a point 3 times subsequent to the point indicated by P2. Then, the degree of interest continues to show the monotonic decrease, and thus the sharing control unit updates the sharing control information to the "non-sharing", at a point 3 times further subsequent.

More specifically, the sharing control unit performs the sharing control such that: the first content item is shared without asking the first user whether or not the first content item can be shared with the second user whose degree of interest is determined as being on the increase; and the first content item is not shared with the second user whose degree of interest is determined as being on the decrease.

More generally, the managing unit (which will be described later) including the sharing control unit causes the first content item to be shared in the third mode with the second user whose degree of interest is determined as being on the increase, and in the fourth mode different from the third mode with the second user whose degree of interest is determined as being on the decrease.

Here, the sharing control unit determines that the degree of interest is on the increase when the degree of interest continuously increases for the most-recent predetermined number of times, and that the degree of interest is on the decrease when the degree of interest continuously decreases for the most-recent predetermined number of times.

As described above, the content managing apparatus according to the present embodiment performs the sharing control by focusing on the transition of the degree of interest over time, in addition to the absolute value of the degree of interest. According to the configuration described above, it is possible to perform the sharing control corresponding to the change in the degree of interest such as "the degree of interest increases more than indicated by the value of the degree of interest".

Embodiment 5

The content managing apparatus according to the present embodiment, when performing a sharing control, automatically generates a title based on a metadata item and transmits the generated title to the second user.

In the descriptions of the content managing apparatuses according to Embodiments 1 to 4, nothing has been mentioned about a title used in sharing of a content item. As to assigning a title, it can be considered that the metadata item resulting from content analysis is assigned as a title and transmitted to the second user together with a content ID, in addition to manually assigning a title by the first user. However, if the metadata item, as it is, is assigned as a title, the title includes only a string of letters of, for example, "Knitted fabric", and there is a possibility that the title is not interesting for the second user. In addition, when the first user manually assigns a title, it is likely that the first user cannot come up with an interesting title for a user or forgets to assign a title.

The content managing apparatus according to the present embodiment includes a sharing control unit 104A which generates a title which is likely to be interesting as much as possible, while utilizing a metadata item. More specifically, the sharing control unit 104A generates a title using a sharing state with the second user, such as similarity in a metadata item between a previously shared content item and a content item to be shared this time, and a period of time elapsed since the previous sharing to the sharing this time.

Figure 17:
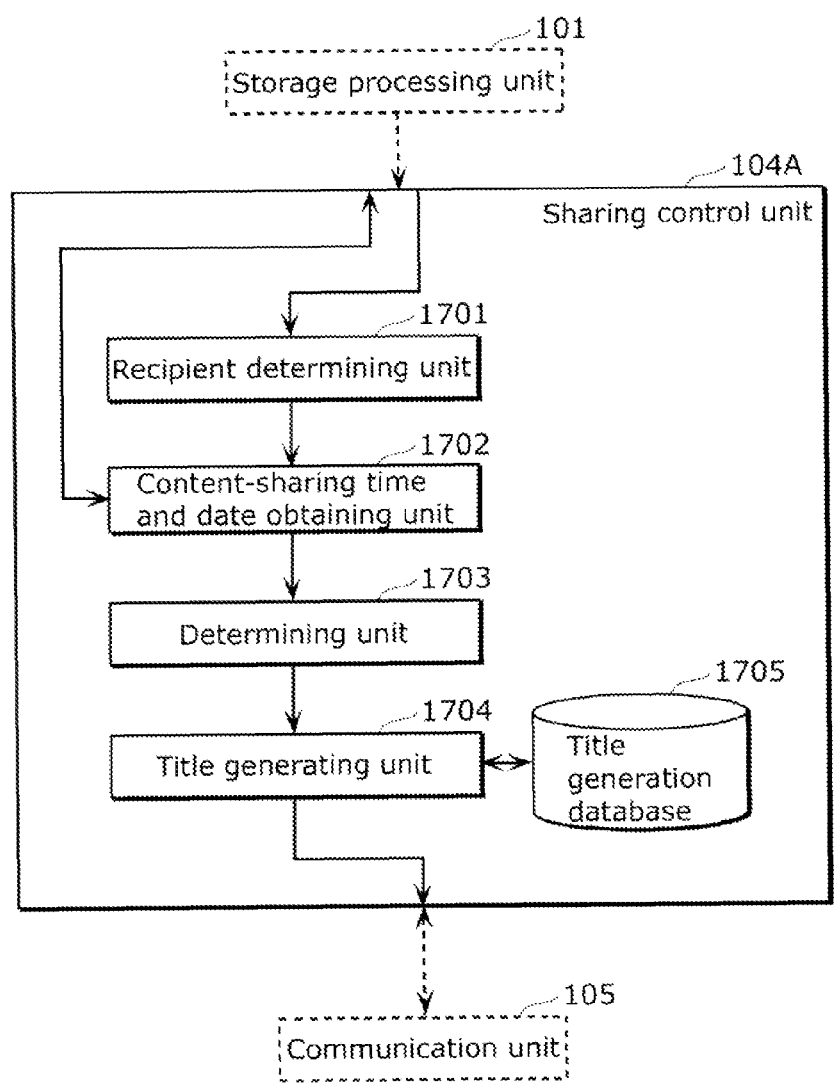
FIG. 17 is a block diagram illustrating a functional configuration of a sharing control unit according to Embodiment 5 of the present invention.

FIG. 17 is a block diagram which illustrates the configuration of the sharing control unit 104A according to the present embodiment. The sharing control unit 104A includes: a recipient determining unit 1701; a content-sharing time and date obtaining unit 1702; a determining unit 1703; a title generating unit 1704; a title generation database 1705. It is to be noted that the title generation database 1705 may be disposed in the storage processing unit 101.

The recipient determining unit 1701 performs processes corresponding to the processes performed by the sharing control units according to Embodiments 1 to 4. Each of the functional blocks from the content-sharing time and date obtaining unit 1702 to the title generation database 1705 according to the present embodiment is a processing unit for generating a title during the period from the point when the recipient determining unit 1701 determines that the first content item is to be shared between the first user and the second user (including an instruction of the first user) to the point when information is transmitted to the communication unit 105 for actually sharing the first content item. The following describes the function of each of the processing units from the content-sharing time and date obtaining unit 1702 to the title generation database 1705.

FIG. 18 is a diagram which explains the flow of processes performed by the content-sharing time and date obtaining unit 1702, the determining unit 1703, the title generating unit 1704, and the title generation database 1705.

When the recipient determining unit 1701 determines the second user with whom the first content item is to be shared by the first user, the content-sharing time and date obtaining unit 1702 transmits, to the storage processing unit 101, a recipient user ID for identifying the second user. Subsequently, the content-sharing time and date obtaining unit 1702 obtains, from the storage processing unit 101, (i) a metadata item which is assigned to a content item shared most recently, among content items shared with the second user in the past, (ii) a content-sharing time and date, and (iii) a title assigned to the content item. It is assumed here that information shown in FIG. 19 is obtained from the storage processing unit 101.

Next, the determining unit 1703 examines whether or not a metadata item of the first content item, which is newly registered and shared this time, is the metadata item same as the metadata item assigned to a content item that is shared most recently (S1802).

When the metadata item is not the same (No in S1802), the title generating unit 1704 generates a title for the case where the metadata item is different (S1803). On the other hand, when the metadata item is the same (Yes in S1802), the title generating unit 1704 calculates the amount of time from the time and date of the most recent sharing to the current time and date, and examines whether or not the calculated amount of time is shorter than or equal to a predetermined threshold (S1804). When the elapsed time is shorter than or equal to the threshold (Yes in S1804), a title for the case of a short elapsed time is generated (S1805). On the other hand, when the elapsed time is longer than the threshold (No in S1804), a title for the case of a long elapsed time is generated (S1806).

Subsequently, the title generating unit 1704 outputs the recipient user ID, the content ID, and the title, to the communication unit 105 (S1807), and ends the processes (when there are two or more second users, the same processes are performed for all of the second users).

The title generating unit 1704 performs the title generating process of Step S1803, Step S1805, and Step S1806, by referring to the title generation database 1705. In Step S1803, since the metadata item assigned to the content item shared most recently and the metadata item assigned to the content item to be shared this time are different, it is necessary to indicate that the content sharing is performed this time in the direction different from the direction of the previous sharing. To this end, templates such as "Next is, (metadata)" and "On to the next subject, this is (metadata)" are registered on the title generation database. The title generating unit 1704 is capable of generating a title which implements the above-described object, by applying the metadata item this time to a portion indicated by the (metadata) in the template.

In Step S1805, since a content item to which the same metadata item is assigned is shared after a short elapsed time, the title generating unit 1704 selects an expression from among such templates as "Once again, (metadata)", and "The sequel to (metadata) the other day". This allows the title generating unit 1704 to generate a title for keeping the interest in the same topic high. It is to be noted that, in selecting an expression from among the templates, since the title assigned to the content item shared most recently has been obtained in Step S1801, it is possible to avoid the succession of similar expressions, by generating a title by the title generating unit 1704 so as to be different from the obtained title.

Step S1806 indicates the case where a content item to which the same metadata item is assigned is shared after a long elapsed time. Accordingly, the title generating unit 1704 selects an expression from among templates such as "This is (metadata), again" and "Thank you for waiting, this is (metadata). According to the configuration described above, it is possible to generate a title for prompting a user to be interested in the topic that has not been shared for a while.

The following is a specific example for explaining the above-described process. The case presented below is where the first content item to which "Taro" is assigned as a metadata item is shared with the second user whose recipient user ID is indicated as UID_00001, at 21:20, on 4 Apr. 2010. It is assumed here that the content-sharing time and date obtaining unit 1702 obtains information shown in FIG. 19, from the storage processing unit 101. In this case, the metadata item indicates the same "Taro", and the elapsed time since the most recent content-sharing time and date is 51 hours and 55 minutes. Given that a predetermined threshold related to the elapsed time is 30 days (720 hours), since the elapsed time is shorter than the threshold, the title generating unit 1704 generates a title for the case of the short elapsed time (for example, "Here's Taro, again").

Another case presented below is where a content item to which "Knitted fabric" is assigned as a metadata item is shared with other conditions being the same as above. The title generating unit 1704 generates a title for the case where the metadata item is different (for example, "Next is, Knitted fabric").

More specifically, the determining unit 1703 included in the sharing control unit 104 determines whether or not the metadata item held by the first content item and the metadata item held by the content item previously shared between the first user and the second user are different. As a result, when the determining unit 1703 determines that the two metadata items are different, the title generating unit 1704 generates a title in the fifth mode. The fifth mode corresponds to the mode in which the title in Step S1803 is generated, for example.

On the other hand, when the determining unit 1703 determines that the two metadata items are identical, the determining unit 1703 determines whether or not the elapsed time since the content item was shared last time is longer than or equal to the predetermined third threshold. Here, when the elapsed time is longer than or equal to the third threshold, the title generating unit 1704 generates a title in the sixth mode that is different from the fifth mode. The sixth mode corresponds to the mode in which the title in Step S1805 is generated, for example.

In addition, when the elapsed time is shorter than the third threshold, the title generating unit 1704 generates a title in the seventh mode that is different from the both of the fifth and the sixth mode. The seventh mode corresponds to the mode in which the title in Step S1806 is generated, for example.

As described above, the content managing apparatus 100 according to the present embodiment generates a title according to the sharing state with the second user and transmits the generated title to the second user, even when the content item is identical. With this, it is possible, without putting a burden on a user, to assign a title in which the second user is more interested than in the case where metadata item is assigned simply as a title.

It is to be noted that, although information such as a metadata item assigned to the most recently shared content item is obtained in the present embodiment, information such as a metadata item assigned to a content item shared the most recent several times or during a predetermined period may be obtained.

In addition, a title may be generated by taking the type of a content item (still image, video, or the like) into account (for example, "Next, a photograph of (metadata)", and so on).

It is to be noted that, in the description above, the case where the sharing state of a content item is managed has been explained as a function of the content managing apparatus. However, the management mode in which a content item is managed by the content managing apparatus according to present invention is not limited to the above. A detailed explanation will be given below with reference to FIG. 20.

Figure 20:
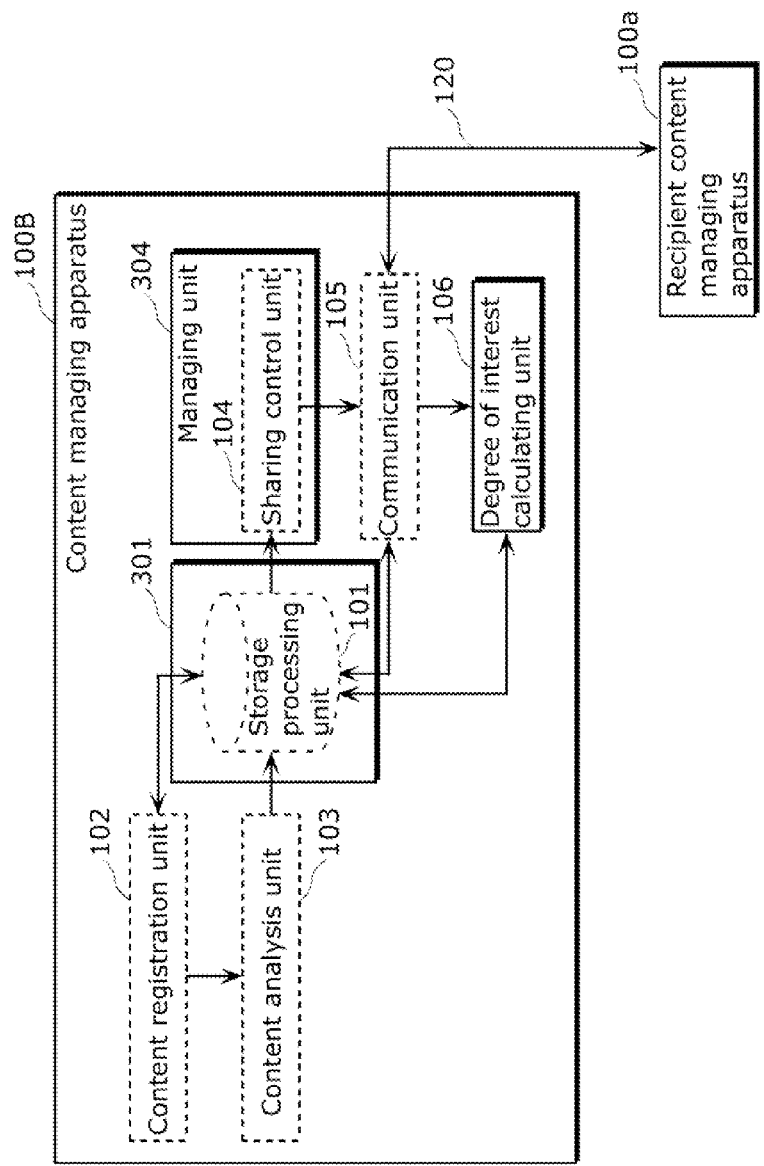
FIG. 20 is a block diagram illustrating an example of another functional configuration of a content managing apparatus according to Embodiment 1 of the present invention.

FIG. 20 is a block diagram illustrating another example of the content managing apparatus according to Embodiment 1 of the present invention.

As shown in FIG. 20, a content managing apparatus 100B according to the present modification includes: an obtaining unit 301; a managing unit 304; and a degree of interest calculating unit 106. It is to be noted that the degree of interest calculating unit 106 is the same constituent element as the degree of interest calculating unit 106 included in the content managing apparatus 100 shown in FIG. 1.

The obtaining unit 301 obtains (i) a first content item held by a first user, (ii) a metadata item that indicates attribute information for classifying the first content item, and (iii) information on a sharing state, between the first user and a second user who is a user other than the first user, of a second content item that is a content item having a metadata item identical to the metadata item held by the first content.

It is to be noted that the obtaining unit 301 includes the storage processing unit 101 in FIG. 20. However, for the configuration of the content managing apparatus 100B, the storage processing unit 101 may be disposed outside the content managing apparatus 100B. For example, the storage processing unit 101 may be disposed in a file server on the Internet, as in a so-called cloud computing. In this case, the obtaining unit 301 obtains, through the network, data stored in the storage processing unit 101 disposed outside the content managing apparatus 100B.

The managing unit 304 manages the first content item based on the degree of interest of the second user.

The management of a content item performed by the managing unit 304 may include a management related to sharing, storing, and deleting a content item, for example.

To be more specific, the managing unit 304 may determine that the first content item should be shared with the second user when the degree of interest of the second user is higher than or equal to the first threshold determined in advance. In this case, the managing unit 304 may include the sharing control unit 104 described in Embodiment 1.

Here, after determining that the first content item should be shared with the second user, the managing unit 304 performs the processes for sharing the first content item with the second user, as described above.

In addition, the managing unit 304 may determine that deletion of the first content item performed by the first user should be prohibited when the degree of interest of the second user is higher than or equal to the predetermined first threshold.

Here, after determining that the deletion of the first content item performed by the first user should be prohibited, the managing unit 304 performs the processes for prohibiting the deletion of the first content item performed by the first user. More specifically, the managing unit 304 may display a warning against an operation of deleting the first content item performed by the first user. Alternatively, the processing may be performed such that the process of deleting the first content item is not carried out even when the first user performs the operation for deleting the first content item. Or, a file attribute of a file including the first content item may be changed to be read-only.

In addition, the managing unit 304 may determine that the first content item should be deleted when the degree of interest of the second user is lower than or equal to the predetermined first threshold.

Here, after determining that the first content item should be deleted, the managing unit 304 performs the processes for deleting the first content item. More specifically, the managing unit 304 may delete the first content item. Alternatively, an image for prompting deletion of the first content item may be displayed on an operation screen used by the user.

It is to be noted that the managing unit 304 may compare the amount of temporal change in the degree of interest with a predetermined threshold. For example, the managing unit 304 may determine that the first content item should be deleted when the degree of interest is lower than or equal to the predetermined threshold during a predetermined period. Alternatively, the managing unit 304 may determine that the deletion of the first content item should be prohibited when the degree of interest is higher than or equal to the predetermined threshold during a predetermined period.

Figure 21:
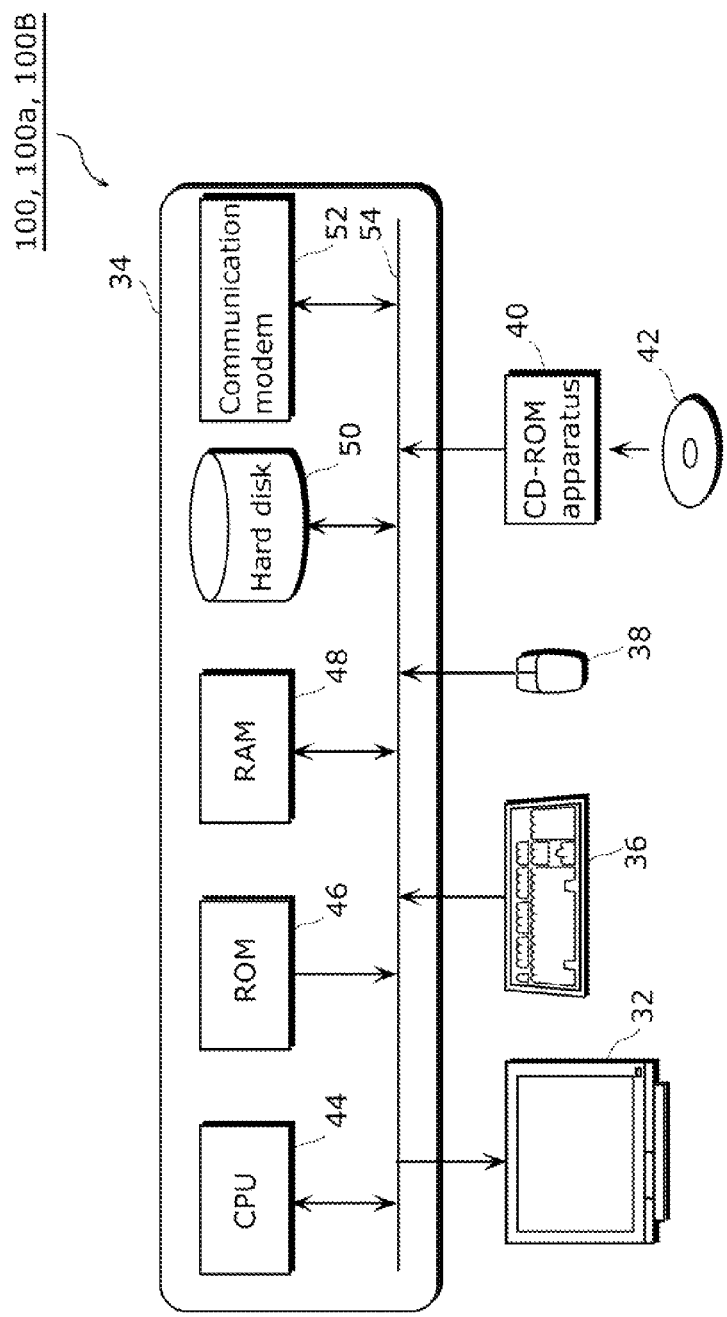
FIG. 21 is a block diagram illustrating a hardware configuration of a computer system that implements the content managing apparatus according to Embodiments 1 to 5 of the present invention.

It is to be noted that the content managing apparatus described in Embodiments 1 to 5 can be implemented by a computer. FIG. 21 is a block diagram illustrating a hardware configuration of a computer system that implements the content managing apparatus.

The content managing apparatus includes: a computer 34; a keyboard 36 and a mouse 38 for giving an instruction to the computer 34; a display 32 for displaying information such as a result of calculation performed by the computer 34; a CD-ROM (Compact Disc-Read Only Memory) apparatus 40 for reading a program executed by the computer 34; and a communication modem (not illustrated).

A program to be performed by the content managing apparatus is stored in the CD-ROM 42 that is a computer readable medium, and read by the CD-ROM apparatus 40. Or, the program is read by a communication modem 52 through the computer network.

The computer 34 includes: a CPU (Central Processing Unit) 44; a ROM (Read Only Memory) 46; a RAM (Random Access Memory) 48; a hard disk 50; the communication modem 52; and a bus 54.

The CPU 44 executes the program read via the CD-ROM apparatus 40 or the communication modem 52. The ROM 46 stores a program or data necessary for the operation of the computer 34. The RAM 48 stores data such as a parameter at the time of executing the program. The hard disk 50 stores the program or the data. The communication modem 52 performs communication with other computers through the computer network. The bus 54 interconnects the CPU 44, the ROM 46, the RAM 48, the hard disk 50, the communication modem 52, the display 32, the keyboard 36, the mouse 38, and the CD-ROM apparatus 40.

A part or all of the constituent elements constituting each of the above-described apparatuses may be configured from a single System-LSI (Large-Scale Integration). The System-LSI is a super-multi-function LSI manufactured by integrating constituent units on one chip, and is specifically a computer system configured by including a microprocessor, a ROM, a RAM, and so on. A computer program is stored in the RAM. The System-LSI achieves its function through the microprocessor's operation according to the computer program.

In addition, a part or all of the constituent elements included in the respective apparatuses may be configured as an IC card which can be attached and detached from the respective apparatuses or as a stand-alone module. The IC card or the module is a computer system configured from a microprocessor, a ROM, a RAM, and so on. The IC card or the module may also include the aforementioned super-multi-function LSI. The IC card or the module achieves its function through the microprocessor's operation according to the computer program. The IC card or the module may also be implemented to be tamper-resistant.

In addition, the present invention may be the method described above. In addition, the present invention may be a computer program which causes a computer to execute these methods, and may also be a digital signal including the computer program.

Furthermore, the present invention may also be realized by storing the computer program or the digital signal in a computer readable recording medium such as flexible disc, a hard disk, a CD-ROM, an MO, a DVD, a DVD-ROM, a DVD-RAM, a BD (Blu-ray Disc®), a USB memory, a memory card such as an SD card, and a semiconductor memory. Furthermore, the present invention also includes the above-described digital signal recorded in these recording media.

Furthermore, the present invention may also be realized by the transmission of the aforementioned computer program or digital signal via a telecommunication line, a wireless or wired communication line, a network represented by the Internet, a data broadcast and so on.

The present invention may also be a computer system including a microprocessor and a memory, in which the memory stores the aforementioned computer program and the microprocessor operates according to the computer program.

Furthermore, by transferring the program or the digital signal by recording onto the aforementioned recording media, or by transferring the program or digital signal via the aforementioned network and the like, execution using another independent computer system is also made possible.

In addition, each of the above-mentioned embodiments and modifications may be combined with each other.

It is to be noted that, the embodiment disclosed here is intended not for the purpose of limitation but for exemplification only. The scope of the present invention is indicated not by the above description but by the claims and includes various changes and modifications may be applied to the embodiments as shown above, unless such changes and modifications depart from the same or equivalent scope of the present invention.

INDUSTRIAL APPLICABILITY

The present invention is applicable to a content managing apparatus. In particular, the present invention is applicable to a content managing apparatus for managing a content item such as an image, an audio, video, a text, and so on.

REFERENCE SIGNS LIST 32 display
34 computer
36 keyboard
38 mouse
40 CD-ROM apparatus 42 CD-ROM
44 CPU
46 ROM
48 RAM
50 hard disk
52 communication modem
54 bus
100, 100B (sharer) content managing apparatus
100a (recipient) content managing apparatus
101 storage processing unit
102 content registration unit
103 content analysis unit
104, 104A sharing control unit
105 communication unit
106, 106A degree of interest calculating unit
301 obtaining unit
304 managing unit
1001 input detail sorting unit
1002 comment analysis unit
1003 comment analysis database
1004 degree of interest calculating unit
1701 recipient determining unit
1702 content-sharing time and date obtaining unit
1703 determining unit
1704 title generating unit
1705 title generation database

The invention claimed is:

1. A content managing apparatus for managing a content item, the apparatus comprising:
 a processor; and
 a non-transitory memory having stored thereon executable instructions, which when executed, cause the processor to perform:
  obtaining (i) a first content item held by a first user, (ii) a metadata item that indicates attribute information for classifying the first content item, and (iii) information on a sharing state of a second content item between the first user and a second user who is a user other than the first user, the second content item being a content item having a metadata item identical to the metadata item held by the first content item;
  calculating a degree of interest of the second user based on the information on the sharing state of the second content item, the degree of interest of the second user being an index indicating an interest of the second user in the metadata item held by the first content item that (i) indicates the attribute information for classifying the first content item and (ii) is identical to the metadata item held by the second content item; and
  managing the first content item, based on the degree of interest of the second user.

2. The content managing apparatus according to claim 1, wherein the information on the sharing state is the number of content-sharing times that is the number of times that the second content item has been shared between the second user and the first user, and
 the degree of interest of the second user is calculated as a value obtained by dividing, by the number of content-sharing times, a sum of values corresponding to at least one of (i) the number of views, (ii) the number of comment input times, (iii) an amount of view time, and (iv) the number of characters in a comment, of the second user for the second content item.

3. The content managing apparatus according to claim 2, wherein said managing further includes causing the first content item to be shared between the first user and the second user when it is determined that the first content item should be shared between the first user and the second user, and
 the executable instructions, when executed, further cause the processor to perform notifying the second user that the first content item is viewable and to increment the number of content-sharing times by one.

4. The content managing apparatus according to claim 1, wherein said managing includes
 (i) examining whether or not the degree of interest of the second user is higher than or equal to a predetermined first threshold, and determining that the first content item should be shared in a first mode between the first user and the second user when the degree of interest is higher than or equal to the first threshold, and
 (ii) for the second user whose degree of interest is lower than the first threshold, examining whether or not the degree of interest is higher than or equal to a predetermined second threshold, and determining that the first content item should be shared in a second mode between the first user and the second user when the degree of interest is lower than the first threshold and higher than or equal to the second threshold, the second mode being different from the first mode.

5. The content managing apparatus according to claim 4, wherein said managing includes
 (i) in the first mode, causing the first content item to be shared between the first user and the second user without asking the first user for confirmation, and
 (ii) in the second mode, asking the first user for confirmation, and causing the first content item to be shared between the first user and the second user only when an instruction to share the first content item is received.

6. The content managing apparatus according to claim 1, wherein said managing includes
 (i) causing the first content item to be shared in a third mode with the second user whose degree of interest is determined as being on an increase, and
 (ii) causing the first content item to be shared in a fourth mode with the second user whose degree of interest is determined as being on a decrease, the fourth mode being different from the third mode.

7. The content managing apparatus according to claim 6, wherein said managing includes
 (i) determining that the degree of interest is on the increase when the degree of interest continuously increases the most-recent predetermined number of times, and
 (ii) determining that the degree of interest is on the decrease when the degree of interest continuously decreases the most-recent predetermined number of times.

8. The content managing apparatus according to claim 1, wherein said managing includes generating a title corresponding to the first content item, based on the metadata item held by the first content item and a past content item shared state between the second user and the first user.

9. The content managing apparatus according to claim 8, wherein the executable instructions, when executed, further cause the processor to perform:
 determining whether or not the metadata item held by the first content item and a metadata item held by a content item previously shared between the first user and the second user are different;
 when the metadata item held by the first content item and the metadata item held by the content item previously shared between the first user and the second user are determined to be different, generating the title in a fifth mode;

when the metadata item held by the first content item and the metadata item held by the content item previously shared between the first user and the second user are determined to be identical, (i) determining whether or not an elapsed time since the content item was shared last time is longer than or equal to a predetermined third threshold, (ii) generating the title in a sixth mode that is different from the fifth mode when the elapsed time is determined as being longer than or equal to the third threshold, and (iii) generating the title in a seventh mode that is different from the both of the fifth mode and the sixth mode when the elapsed time is determined as being shorter than the third threshold.

10. The content managing apparatus according to claim 1, wherein said managing includes determining that the first content item should be shared with the second user when the degree of interest of the second user is higher than or equal to a predetermined first threshold.

11. The content managing apparatus according to claim 1, wherein said managing includes determining that deletion of the first content item by the first user should be prohibited when the degree of interest of the second user is higher than or equal to a predetermined first threshold.

12. The content managing apparatus according to claim 1, wherein said managing includes determining that the first content item should be deleted when the degree of interest of the second user is lower than or equal to a predetermined first threshold.

13. The content managing apparatus according to claim 1, wherein the information on the sharing state is the number of content-sharing times indicating the number of times that the second content item has been shared between the second user and the first user, and the degree of interest of the second user is calculated as a value obtained by dividing, by the number of content-sharing times, a sum of values corresponding to at least one of (i) a period of time from a point when the second content item is shared between the second user and the first user to a point when the second user views the second content item for the first time, (ii) a period of time from a point when the second user confirms the sharing state of the second content item between the second user and the first user to a point when the second user views the second content item for the first time, (iii) a difference obtained by subtracting a value corresponding to the number of negative comments on the second content item from a value corresponding to the number of positive comments on the second content item, (iv) a period of time from a point when the second user views the second content item to a point when the second user views the same second content item next time, (v) a period of time from a point when the second user views the second content item to a point when the second user inputs a comment on the second content item, and (vi) a ratio of a period of view time of the second content item by the second user to a total view time of all content items by the second user during a predetermined period of time, the negative comments and positive comments being inputted by the second user.

14. The content managing apparatus according to claim 1, wherein said managing includes using, as the degree of interest of the second user when the first content item has the metadata item including a plurality of metadata items, one of (i) a highest degree of interest among degrees of interest of the second user in the respective metadata items, (ii) a lowest degree of interest among the degrees of interest of the second user in the respective metadata items, and (iii) an average of the degrees of interest of the second user in the respective metadata items.

15. A content managing method for managing a content item, the method comprising:

obtaining (i) a first content item held by a first user, (ii) a metadata item that indicates attribute information for classifying the first content item, and (iii) information on a sharing state of a second content item between the first user and a second user who is a user other than the first user, the second content item being a content item having a metadata item identical to the metadata item held by the first content item;

calculating a degree of interest of the second user based on the information on the sharing state of the second content item, the degree of interest of the second user being an index indicating an interest of the second user in the metadata item held by the first content item that (i) indicates the attribute information for classifying the first content item and (ii) is identical to the metadata item held by the second content item; and managing the first content item, based on the degree of interest of the second user.

16. A non-transitory computer-readable recording medium for use in a computer, the recording medium having a computer program recorded thereon for causing the computer to execute: each of the steps included in the content managing method according to claim 15.

17. An integrated circuit comprising:

a processor; and a non-transitory memory having stored thereon executable instructions, which when executed, cause the processor to perform:

obtaining (i) a first content item held by a first user, (ii) a metadata item that indicates attribute information for classifying the first content item, and (iii) information on a sharing state of a second content item between the first user and a second user who is a user other than the first user, the second content item being a content item having a metadata item identical to the metadata item held by the first content item;

calculating a degree of interest of the second user based on the information on the sharing state of the second content item, the degree of interest of the second user being an index indicating an interest of the second user in the metadata item held by the first content item that (i) indicates the attribute information for classifying the first content item and (ii) is identical to the metadata item held by the second content item; and managing the first content item, based on the degree of interest of the second user.

* * * * *